(12) United States Patent
Ohwada

(10) Patent No.: US 7,676,669 B2
(45) Date of Patent: Mar. 9, 2010

(54) MULTI-CORE PROCESSOR CONTROL METHOD

(75) Inventor: Akihiko Ohwada, Saitama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/976,516

(22) Filed: Oct. 25, 2007

(65) Prior Publication Data

US 2008/0065867 A1 Mar. 13, 2008

Related U.S. Application Data

(62) Division of application No. 11/012,349, filed on Dec. 16, 2004.

(30) Foreign Application Priority Data

Jun. 15, 2004  (JP) .............................. 2004-176619

(51) Int. Cl.
*G06F 15/177* (2006.01)

(52) U.S. Cl. .......................................... 713/1; 713/100

(58) Field of Classification Search .................... 713/1, 713/100
See application file for complete search history.

(56) References Cited

U.S. PATENT DOCUMENTS

2001/0042159 A1* 11/2001 Roohparvar ................. 711/103
2004/0006729 A1*  1/2004 Pendurkar ................... 714/733
2004/0210738 A1   10/2004 Kato et al.

FOREIGN PATENT DOCUMENTS

JP        2001-051957       2/2003

* cited by examiner

*Primary Examiner*—Tse Chen
(74) *Attorney, Agent, or Firm*—Hanify & King, P.C.

(57) ABSTRACT

The load/sense control of the setting value that corresponds to the processor core for CMP, etc. processors that have multi-cores realize, for such processors with multi-core structures, the shortening of system boot time during multi-core operation, flexible debugging methods, and improvement of yield with the aid of partial core quality product chips at time of semiconductor production, by equipping a core selection flag register that maintains the status of each core, and controlling the output to the core block from the processor common block through that core selection flag register status.

5 Claims, 15 Drawing Sheets

MULTI-CORE PROCESSOR CONTROL METHOD

CROSS REFERENCE TO RELATED APPLICATION

This application is a divisional application of application Ser. No. 11/012,349, filed Dec. 16, 2004, now pending, which is related to and claims priority to Japanese Application No. 2004-176619, filed Jun. 15, 2004 in the Japanese Patent Office, all the contents of which are incorporated by reference herein.

BACKGROUND OF THE INVENTION

1. Field of the Invention

The present invention is related to processor control methods of multiple execution processing cores ("cores") of CPUs (Central Processing Units), MPUs (Micro Processing Units), DSPs (Digital Signal Processors), and GPUs (Graphics Processing Units, or graphic processing LSIs, or geometry engines), etc., or other applicable processors.

2. Description of the Related Art

Conventionally, computer systems such as servers that demand particularly high processing abilities such as mission-critical processing for enterprises have improved their processing ability by connecting to multiple processors by being structured using a loosely coupled cluster structure, or a tightly coupled structure through an SMP (Symmetrical Multi-Processor) structure.

However, for loosely coupled cluster structures the communication overhead between server nodes is an issue, and for tightly coupled SMP structures the complexity of server hardware is an issue, so either case has limitations regarding the improvement of performance for singular computer systems using current architecture.

Here, in the field of high-end processors, multi-core processors such as CMPs (Chip Multi-Processors), etc. that make performance improvement possible are currently becoming mainstream by applying a multi-core structure that implements multiple cores within one processor.

However, in the case of a multi-core structure such as that of a CMP, etc., in exchange for the improvement of processing performance through an increase in core numbers, problems such as complication of controls by implementing multiple cores and a decrease in yield during semiconductor production due to the increase in die size have occurred. In particular, the decrease in yield during semiconductor production due to the increase in die size is a very important issue for multi-core processors that use multi-cores such as CMPs, etc.

FIG. 1 shows the basic hardware structure conventional in single-core processors.

Processor 101 is comprised of common block 102 structured from secondary shared cache 111 and local interconnect interface 111 [sic], and core block 103 structured from primary command cache 112, primary data cache 113, command branch unit 114, command issuance unit 115, load/store unit 116, general-purpose register file 117, integer arithmetic unit 118, unit for integer arithmetic 119, floating point register file 120, floating point operation unit 121, and floating point operation completion unit 122. Processor 101 connects to other processors and main memory through local interconnect interface 110, and instructions or data is supplied from the main memory.

The instructions supplied from local interconnect interface 110 are supplied to general-purpose register file 117 or floating point register file 120 through secondary cache 111, primary command cache 112, and command branch unit 114, and instructions are given to integer arithmetic unit 118 or floating point operation unit 120.

Data supplied from local interconnect interface 110 gives data to integer arithmetic unit 118 or floating point operation unit 121 by being supplied to general-purpose register file 117 or floating point register file 120 through secondary sharing cache 111, primary data cache 113, and load/store unit 116.

The data that corresponds to operations for the aforementioned integer arithmetic unit 118, or the operation result for integer arithmetic unit 118, is rewritten to the general-purpose register file 117 through integer arithmetic completion unit 119, and is retained. The data that corresponds to operations for floating point operation unit 120, or the operation result for floating point operation unit 120, is rewritten to floating point register file 121 through floating point operation completion unit 122, and is stored.

Thus, to improve processing performance of computer systems such as servers, there is a method to increase the number of operations included within a computer system.

Also, FIG. 2 shows a server structure that uses conventional symmetrical multiprocessors. Processor 201 is structured from singular CORE block 211 and secondary cache block 212.

Also, the server system is structured from the aforementioned multiple processors 201 connected via the processor local interconnect, processor local interconnect arbiter 202, service processor 203 connected via the (Joint Test Action Group) JTAG interface standardized through IEEE 1149.1, and the system back plane crossbar controller 206 connected via the system back plane crossbar. Processor local interconnect arbiter 202 performs arbitration controls between each processor connected to the processor local interconnect. Also, system back plane crossbar controller 206 performs interface controls between each system board connected to the system back plane crossbar.

For CORE blocks 211 within the aforementioned multiple processors 201, settings are made for the register and scan FF, etc. within each CPU by controlling service processor 203 through service processor program 204 and service processor terminal 205, and by performing a scan through the JTAG interface.

Next, as one example of multi-core processor application, FIG. 3 shows a server system structure that uses 2 CMP multi-core processors and thus has 2 cores. Processor 301 is comprised of CORE 0 block 311, CORE 1 block 312, and CMP common block 310. Also, the server system comprises the aforementioned multiple processor 301 connected through processor local interconnect, and processor local interconnect arbiter 202, service processor 203 connected through the JTAG interface, and system back plane crossbar controller 206 connected through the system back plane crossbar. For CORE 0 block 311 and CORE 1 block 312 within the aforementioned multiple processor 301, by controlling service processor 203 through service processor program 204 and service processor terminal 205, and performing a scan through the JTAG interface, the register and scan FF, etc. within each CPU are set.

Also, FIG. 4 shows conventional multi-core processor structure number 1. Processor 401 is a 2-core multi-core processor comprised of CORE 0 block 411, CORE 1 block 412, and CMP common block 410.

Also, the JTAG controller includes Test Access Port (TAP) controller 413, decoder 415, load controller 416, and load register 417 each on the CMP common block side, CORE 0 register controller 418 and CORE 0 setup register 419 each on the CORE 0 block side, and CORE 1 register controller 420 and CORE 1 setup register 421 each on the CORE 1 block side.

TAP controller 413 performs setting of the load data (scan data) for the core by scan controls for load register 417. Then, JTAG command 414 issued from TAP controller 413 is decoded by decoder 415, and using those decoded results, load controller 416 controls CORE 0 register controller 418 and CORE 1 register controller 419 using a load control signal (load valid) of load data scan set to load register 417, and the same load data settings are simultaneously done to CORE 0 setup register 419 and CORE 1 setup register 420.

In this conventional structure number 1, since only the same load data can be set to CORE 0 setup register 419 and CORE 1 setup register 420, there was a problem of being unable to set individual settings on each core.

Next, FIG. 5 shows conventional multi-core processor structure number 2. Processor 501 is a 2-core multi-core processor comprised of CORE 0 block 411, CORE 1 block 412, and CMP common block 410. Also, the JTAG controller includes TAP controller 413, decoder for CORE 0 515, load controller for CORE 0 516, load register for CORE 0 517, decoder for CORE 1 519, load controller 520 for CORE 1, and load register for CORE 1 521 each on the CMP common block side, CORE 0 register controller 418 and CORE 0 setup register 419 each on the CORE 0 block side, and CORE 1 register controller 420 and CORE 1 setup register 421 each on the CORE 1 block side.

TAP controller 413 performs setting of the load data for the core by scan controlling load register for CORE 0 517 and load register for CORE 1.

First, JTAG command-0 514 issued from TAP controller 413 is decoded by decoder for CORE 0 515, and through those decoded results, load controller for CORE 0 516 controls CORE 0 register controller 418 using a load control signal (load valid) signal on the load data scan set to load register for CORE 0 517, and by controlling CORE 0 register controller 418, the aforementioned load data setting is done on CORE 0 setup register 419.

Next, JTAG command-1 518 issued from TAP controller 413 is decoded with decoder for CORE 1 519, and from these decoded results, load controller for CORE 1 520 controls CORE 1 register controller 420 using a load control signal (load valid) signal on the load data scan set to load register for CORE 1 521, and by controlling CORE 1 register controller 420, the aforementioned load data setting is done on CORE 1 setup register 421.

In this conventional structure number 2, similar to decoder for CORE 0 515, load controller for CORE 0 516, load register for CORE 0 517, decoder for CORE 1 519, load controller for CORE 1 520, and load register for CORE 1 521, the same number of hardware for core controls as the number of cores is required. Due to this, there has been an issue of difficult applicability, since multi-core control logic must become large-scale for large-scale multi-core processors that are likely to become mainstream in the future.

Also, FIG. 6 shows conventional multi-core processor structure number 3. Processor 601 is a 2-core multi-core processor comprised of CORE 0 block 411, CORE 1 block 412, and CMP common block 410. Also, the JTAG controller includes TAP controller 413, decoder 616, load controller 617, and load register 618 each on the CMP common block side, and CORE 0 register controller 418 and CORE 0 setup register 419 each on the CORE 0 block side, and CORE 1 register controller 420 and CORE 1 setup register 421 each on the CORE 1 block side.

First, TAP controller 413 performs settings of load data for CORE 0 through scan control of load register 618. JTAG command-0 614 issued from TAP controller 413 is decoded by decoder 616, and from those decoded results, load controller 617 controls CORE 0 register controller 418 using a load control signal (load valid-0) of the scan set load data on load register 618, and the aforementioned load data is set on CORE 0 setup register 419.

Next, TAP controller 413 performs settings of load data for CORE 1 through scan control of load register 618. JTAG command-1 615 issued from TAP controller 413 is decoded by decoder 616, and from those decoded results, load controller 617 controls CORE 1 register controller 420 using a load control signal (load valid-1) of the scan set load data on load register 618, and the aforementioned load data is set on CORE 1 setup register 421.

In this conventional structure number 3, similar to JTAG command-0 614 and JTAG command-1 615, the same number of JTAG commands as the number of cores is required. Due to this, there has been an issue of difficult applicability, since decode logic must become large-scale for large-scale multi-core processors that are likely to become mainstream in the future.

Other patent literature for chip multiprocessors includes Japanese Unexamined Patent Application Publication 2001-51957.

As described above, conventional technology of processors with multi-core structures through CMP, etc., has problems such as complication of controls for multiple cores and a decrease of yield due to an increase in die size. A need arises for a technique by which controls for multiple processors can be provided without undue complication or decrease of yield.

SUMMARY OF THE INVENTION

The present invention, for processors that are CMP, etc. with a multi-core structure, has the objective of equipping core selection flag registers that maintain each core's status, and through the status of these core selection flag registers, the output from the processor common blocks to the core blocks are controlled, and a flexible core settings method can be supported, thus actualizing the shortening of system boot time during multi-core operation, flexible debugging methods, and improvement of yield through the relief of partial core quality chips during semiconductor production.

According to one embodiment of the present invention, a processor comprises a logic block comprising a plurality of execution processing cores that are operable individually and each having an internal setting register, a data register operable to maintain setting information for the internal setting register of each of the plurality of execution processing cores, a load controller operable to perform load control of setting information to the internal setting register of each of the plurality of execution processing cores that are maintainable by the data register, a core selection flag register operable to maintain selection information of each of the plurality of execution processing cores, and an interceptor operable to intercept a load control signal to the internal setting register of each of the plurality of execution processing cores from the load controller according to a value from the core selection flag register.

According to one embodiment of the present invention, a processor comprising a logic block comprising a plurality of execution processing cores that are operable individually and each having an internal setting register, a data register operable to maintain setting information for the internal setting register of each of the plurality of execution processing cores, a sense controller operable to perform sense control of the setting information and to maintain the internal setting register of each of the plurality of execution processing cores, a core selection flag register operable to maintain selection information of each of the plurality of execution processing cores, and an interceptor operable to intercept a sense control signal to the internal setting register of each of the plurality of execution processing cores from the sense controller according to a value from the core selection flag register.

According to one embodiment of the present invention, a processor comprises a logic block comprising a plurality of execution processing cores that are operable individually and each having an internal setting register, a data register operable to maintain setting information for the internal setting register of each of the plurality of execution processing cores, a load controller operable to perform load control of setting information to the internal setting register of each of the plurality of execution processing cores that are maintainable by the data register, a core selection fuse device operable to set selection information of each of the plurality of execution processing cores, and an interceptor operable to intercept a load control signal to the internal setting register of each of the plurality of execution processing cores from the load controller according to a value of the core selection fuse device. The processor further comprises a fuse overwrite scan latch operable to overwrite a content of the core selection fuse device by connecting to an output of the core selection fuse device, and to scan setting new core selection information through a TAP controller operable to perform scan controls and a selector operable to make the output of the core selection fuse device, or an output of the fuse overwrite scan latch, become the input.

According to one embodiment of the present invention, a processor comprises a logic block comprising a plurality of execution processing cores that are operable individually and each having an internal setting register, a data register operable to maintain setting information for the internal setting register of each of the plurality of execution processing cores, a sense controller operable to perform sense control of the setting information and to maintain the internal setting register of each of the plurality of execution processing cores, a core selection fuse device operable to set selection information of each of the plurality of execution processing cores, and an interceptor operable to intercept a sense control signal to the internal setting register of each of the plurality of execution processing cores from the sense controller according to a value from the core selection fuse device. The processor further comprises a fuse overwrite scan latch operable to overwrite a content of the core selection fuse device by connecting to an output of the core selection fuse device, and to scan setting new core selection information through a TAP controller operable to perform scan controls and a selector operable to make the output of the core selection fuse device, or an output of the fuse overwrite scan latch, become the input.

According to one embodiment of the present invention, a processor control method for a processor comprising a logic block comprising a plurality of execution processing cores that are operable individually and each having an internal setting register, the method comprises selecting at least one of the plurality of execution processing cores by setting core selection information to a core selection flag register, setting information for any of the selected execution processing cores to a data register, and loading the set setting information for any of the selected execution processing cores to the data register.

According to one embodiment of the present invention, a processor control method for a processor comprising a logic block comprising a plurality of execution processing cores that are operable individually and each having an internal setting register, the method comprises selecting one of the plurality of execution processing cores by setting core selection information to a core selection flag register, sensing setting information from the selected execution processing core to a data register.

According to one embodiment of the present invention, a processor control method for a processor comprising a logic block comprising a plurality of execution processing cores that are operable individually and each having an internal setting register, the method comprises selecting at least one of the plurality of execution processing cores by setting core selection information by disconnecting a core selection fuse device, setting information for any of the selected execution processing cores to a data register, and loading the set setting information for any of the selected execution processing cores to the data register. The method further comprises overwriting contents of the core selection fuse device by scan setting new core selection information to a fuse overwrite scan latch connected to an output of the core selection fuse device by a TAP controller that performs scan controls, after the selecting step.

According to one embodiment of the present invention, a processor control method for a processor comprising a logic block comprising a plurality of execution processing cores that are operable individually and each having an internal setting register, the method comprises selecting at least one of the plurality of execution processing cores by setting core selection information by disconnecting a core selection fuse device and sensing setting information from the selected execution processing core to a data register. The method further comprises overwriting contents of the core selection fuse device by scan setting new core selection information to a fuse overwrite scan latch connected to an output of the core selection fuse device by a TAP controller that performs scan controls, after the selecting step.

According to one embodiment of the present invention, a processor comprises a plurality of logic blocks for processors comprising a primary execution processing core and secondary execution processing core operable individually and each having an internal setting register, a plurality of common block portions with cache means that are shared by the primary execution processing cores or the secondary execution processing cores, a TAP controller operable to perform processor control by issuing JTAG commands, a data register operable to maintain setting information for a setting register of the primary execution processing core and the secondary execution processing core, a load controller operable to perform load control of data maintained by the data register for a setting register of the primary execution processing core and the secondary execution processing core, by connecting to the data register, a core selection flag register operable to maintain selection information of the primary execution processing core and the secondary execution processing core for each execution processing core, a flag register controller operable to perform setting control of the core selection flag register by connecting to the core selection flag register, and an interceptor operable to intercept a load control signal to the setting register of each of the plurality of execution processing cores from the load controller according to a value from the core selection flag register.

According to one embodiment of the present invention, a processor comprises a plurality of logic blocks for processors comprising a plurality of execution processing cores operable individually and each having an internal setting register, a plurality of common block portions with cache means that are shared by the plurality of execution processing cores, a TAP controller operable to perform processor control by issuing JTAG commands, a data register operable to maintain setting information for a setting register of the plurality of processing cores, a load controller operable to perform load control of data maintained by the data register for a setting register of the plurality of execution processing cores, by connecting to the data register, a core selection flag register operable to maintain selection information of the plurality of execution processing cores for each execution processing core, a flag register controller operable to perform setting control of the core selection flag register by connecting to the core selection flag register, and an interceptor operable to intercept a load control signal to the setting register of each of the plurality of execution processing cores from the load controller according to a value from the core selection flag register.

According to one embodiment of the present invention, a processor comprises a plurality of logic blocks for processors comprising a primary execution processing core and secondary execution processing core operable individually and each having an internal setting register, a plurality of common block portions with cache means that are shared by the primary execution processing cores or the secondary execution processing cores, a TAP controller operable to perform processor control by issuing JTAG commands, a data register operable to maintain setting information sensed from a setting register of the primary execution processing core and the secondary execution processing core, a sense controller operable to perform sense control of data maintained by the data register for a setting register of the primary execution processing core and the secondary execution processing core, by connecting to the data register, a core selection flag register operable to maintain selection information of the primary execution processing core and the secondary execution processing core for each execution processing core, a flag register controller operable to perform setting control of the core selection flag register by connecting to the core selection flag register, and an interceptor operable to intercept a sense control signal to the setting register of the primary execution processing core and the secondary execution processing core from the load controller according to a value from the core selection flag register.

According to one embodiment of the present invention, a processor comprises a plurality of logic blocks for processors comprising a plurality of processing cores operable individually and each having an internal setting register, a plurality of common block portions with cache means that are shared by the plurality of processing cores, a TAP controller operable to perform processor control by issuing JTAG commands, a data register operable to maintain setting information for a setting register of the plurality of processing cores, a sense controller operable to perform sense control of data maintained by a setting register of the plurality of processing cores, by connecting to the data register, a core selection flag register operable to maintain selection information of the plurality of execution processing cores for each execution processing core, a flag register controller operable to perform setting control of the core selection flag register by connecting to the core selection flag register, and an interceptor operable to intercept a sense control signal to the setting register of each of the plurality of execution processing cores from the sense controller according to a value from the core selection flag register.

According to one embodiment of the present invention, a processor comprises a plurality of logic blocks for processors comprising a primary execution processing core and secondary execution processing core operable individually and each having an internal setting register, a plurality of common block portions with cache means that are shared by the primary execution processing cores or the secondary execution processing cores, a TAP controller operable to perform processor control by issuing JTAG commands, a data register operable to maintain setting information for a setting register of the primary execution processing core and the secondary execution processing core, a load controller operable to perform load control of data maintained by the data register for a setting register of the primary execution processing core and the secondary execution processing core, by connecting to the data register, a core selection fuse device operable to maintain selection information of the primary execution processing core and the secondary execution processing core for each execution processing core, and an interceptor operable to intercept a load control signal to the setting register of the primary execution processing core and the secondary execution processing core according to the value of the core selection fuse device. The processor further comprises a fuse overwrite scan latch operable to overwrite an output of the core selection fuse device by connecting to an output of the core selection fuse device and to set the core selection information from scan settings of the TAP controller and a selector operable to make the output of the core selection fuse device, or an output of the fuse overwrite scan latch, the input.

According to one embodiment of the present invention, a processor comprises a plurality of logic blocks for processors comprising a plurality of execution processing cores operable individually and each having an internal setting register, a plurality of common block portions with cache means that are shared by the plurality of execution processing cores, a TAP controller operable to perform processor control by issuing JTAG commands, a data register operable to maintain setting information for a setting register of the plurality of processing cores, a load controller operable to perform load control of data maintained by the data register for a setting register of the plurality of execution processing cores, by connecting to the data register, a core selection fuse device operable to maintain selection information of the plurality of execution processing cores for each execution processing core, an interceptor operable to intercept a load control signal to the setting register of each of the plurality of execution processing cores from the load controller according to a value from the core selection fuse device. The processor further comprises a fuse overwrite scan latch operable to overwrite an output of the core selection fuse device by connecting to an output of the core selection fuse device and to set the core selection information from scan settings of the TAP controller and a selector operable to make the output of the core selection fuse device, or an output of the fuse overwrite scan latch, the input.

According to one embodiment of the present invention, a processor control method for a processor comprising a plurality of logic blocks comprising a primary execution processing core and secondary execution processing core operable individually and having an internal setting register and having common block portions with cache means that are shared by the primary execution processing core or the secondary execution processing core, wherein the plurality of logic block means further comprises a TAP controller operable to perform processor control by issuing JTAG commands; a data register operable to maintain setting information for a setting register of the primary execution processing core and the secondary execution processing core, a load controller operable to perform load control of data maintained by the data register for a setting register of the primary execution processing core and the secondary execution processing core, by connecting to the data register, a core selection flag register operable to maintain selection information of the primary execution processing core and the secondary execution processing core for each execution processing core, a flag register controller operable to perform setting control of the core selection flag register by connecting to the core selection flag register, and an interceptor operable to intercept a load control signal to the setting register of each of the plurality of execution processing cores from the load controller according to a value from the core selection flag register, the method comprises selecting the primary execution processing core or the secondary execution processing core by performing settings of core selection information by issuing a primary JTAG command to the flag controller from the TAP controller, setting information that corresponds to the primary execution processing core or the secondary execution processing core through scan settings, for the data register from the TAP controller, and loading to the setting register of a execution processing core selected for data register content by issuing a secondary JTAG command for the load controller from the TAP controller.

According to one embodiment of the present invention, a processor control method for a processor comprising a plurality of logic blocks comprising a plurality of processing cores operable individually and having an internal setting register and having common block portions with cache means that are shared by the a plurality of processing cores, wherein the plurality of logic block means further comprises a TAP controller operable to perform processor control by issuing JTAG commands; a data register operable to maintain setting information for a setting register of the a plurality of processing cores, a load controller operable to perform load control of data maintained by the data register for a setting register of the a plurality of processing cores, by connecting to the data register, a core selection flag register operable to maintain selection information of the a plurality of processing cores for each execution processing core, a flag register controller operable to perform setting control of the core selection flag register by connecting to the core selection flag register, and an interceptor operable to intercept a load control signal to the setting register of each of the plurality of execution processing cores from the load controller according to a value from the core selection flag register, the method comprises selecting one of the plurality of processing cores by performing settings of core selection information by issuing a primary JTAG command to the flag controller from the TAP controller, setting information that corresponds to selected one of the plurality of processing cores through scan settings, for the data register from the TAP controller, and loading to the setting register of a execution processing core selected for data register content by issuing a secondary JTAG command for the load controller from the TAP controller.

According to one embodiment of the present invention, a processor control method for a processor comprising a plurality of logic blocks comprising a primary execution processing core and secondary execution processing core operable individually and having an internal setting register and having common block portions with cache means that are shared by the primary execution processing core or the secondary execution processing core, wherein the plurality of logic block means further comprises a TAP controller operable to perform processor control by issuing JTAG commands; a data register operable to maintain setting information for a setting register of the primary execution processing core and the secondary execution processing core, a sense controller operable to perform sense control of data maintained by the data register for the setting register of the primary execution processing core and the secondary execution processing core, by connecting to the data register, a core selection flag register operable to maintain selection information of the primary execution processing core and the secondary execution processing core for each execution processing core, a flag register controller operable to perform setting control of the core selection flag register by connecting to the core selection flag register, and an interceptor operable to intercept a sense control signal to the setting register of each of the plurality of execution processing cores from the sense controller according to a value from the core selection flag register, the method comprises selecting the primary execution processing core or the secondary execution processing core by setting core selection information by issuing a primary JTAG command to the flag controller from the aforementioned TAP controller and sensing setting register contents of the selected execution processing core to the data register by issuing a secondary JTAG command for the sense controller from the TAP controller.

According to one embodiment of the present invention, a processor control method for a processor comprising a plurality of logic blocks comprising a plurality of processing cores operable individually and having an internal setting register and having common block portions with cache means that are shared by the a plurality of processing cores, wherein the plurality of logic block means further comprises a TAP controller operable to perform processor control by issuing JTAG commands; a data register operable to maintain setting information for a setting register of the a plurality of processing cores, a sense controller operable to perform sense control of data maintained by the data register for a setting register of the a plurality of processing cores, by connecting to the data register, a core selection flag register operable to maintain selection information of the a plurality of processing cores for each execution processing core, a flag register controller operable to perform setting control of the core selection flag register by connecting to the core selection flag register, and an interceptor operable to intercept a sense control signal to the setting register of each of the plurality of execution processing cores from the sense controller according to a value from the core selection flag register, the method comprises selecting one of the plurality of execution cores by performing setting of core selection information by issuing a primary JTAG command to the flag controller from the TAP controller and sensing setting register contents of the selected execution processing core to the data register by issuing a secondary JTAG command for the sense controller from the aforementioned TAP controller.

According to one embodiment of the present invention, a processor comprises a plurality of logic blocks for processors comprising a primary execution processing core and secondary execution processing core operable individually and each having an internal setting register, a plurality of common block portions with cache means that are shared by the primary execution processing cores or the secondary execution processing cores, a TAP controller operable to perform processor control by issuing JTAG commands, a data register operable to maintain setting information for a setting register of the primary execution processing core and the secondary execution processing core, a load controller operable to perform load control of data maintained by the data register for a setting register of the primary execution processing core and the secondary execution processing core, by connecting to the data register, a core selection fuse device operable to perform setting of selection information of the primary execution processing core and the secondary execution processing core for each execution processing core, an interceptor operable to intercept a load control signal to the setting register of each of the plurality of execution processing cores from the load controller according to a value from the core selection flag register, a selector operable to select the primary or secondary execution processing core by performing setting of core selection information by cutting the core selection fuse device, a device operable to set setting information for the primary execution processing core or secondary execution processing core through scan settings for the data register from the TAP controller, and a load controller operable to load the data register contents to the setting register of the selected execution processing core by issuing a JTAG command for the data register from the aforementioned TAP controller. The processor further comprises a fuse overwrite scan latch operable to overwrite an output of the core selection fuse device by connecting to an output of the core selection fuse device, and setting the core selection information through scan settings from the TAP controller and a selector operable to make the output from the core selection fuse device, or the output from the fuse overwrite scan latch, the input. The processor further comprises a setting device operable, after the selection of the one of the plurality of execution processing cores by setting the core selection information by cutting the aforementioned core selection fuse means, to if necessary, scan set the core selection information to the fuse overwrite scan latch, and to select and output the output of the fuse overwrite scan latch for the aforementioned selector.

According to one embodiment of the present invention, a processor comprises a plurality of logic blocks for processors comprising a plurality of processing cores operable individually and each having an internal setting register, a plurality of common block portions with cache means that are shared by the plurality of processing cores, a TAP controller operable to perform processor control by issuing JTAG commands, a data register operable to maintain setting information for a setting register of the plurality of processing cores, a load controller operable to perform load control of data maintained by the data register for the setting register of the plurality of execution processing cores, by connecting to the data register, a core selection fuse device operable to maintain selection information of the plurality of execution processing cores for each execution processing core, a selector operable to select one of the plurality of execution processing cores by setting core selection information by cutting the core selection fuse device, a device operable to set setting information for one of the plurality of execution processing cores through scan settings for the data register from the TAP controller, and a load controller operable to load data register contents to the setting register of the appropriately selected execution processing core by issuing a JTAG command for the load controller from the TAP controller. The processor further comprises a fuse overwrite scan latch operable to overwrite an output of the core selection fuse device by connecting to an output of the core selection fuse device, and setting the core selection information through scan settings from the TAP controller and a selector operable to make the output from the core selection fuse device, or the output from the fuse overwrite scan latch, the input. The processor further comprises a setting device operable, after the selection of the one of the plurality of execution processing cores by setting the core selection information by cutting the aforementioned core selection fuse means, to if necessary, scan set the core selection information to the fuse overwrite scan latch, and to select and output the output of the fuse overwrite scan latch for the aforementioned selector.

DETAILED DESCRIPTION OF THE PREFERRED EMBODIMENTS

Figure 1:
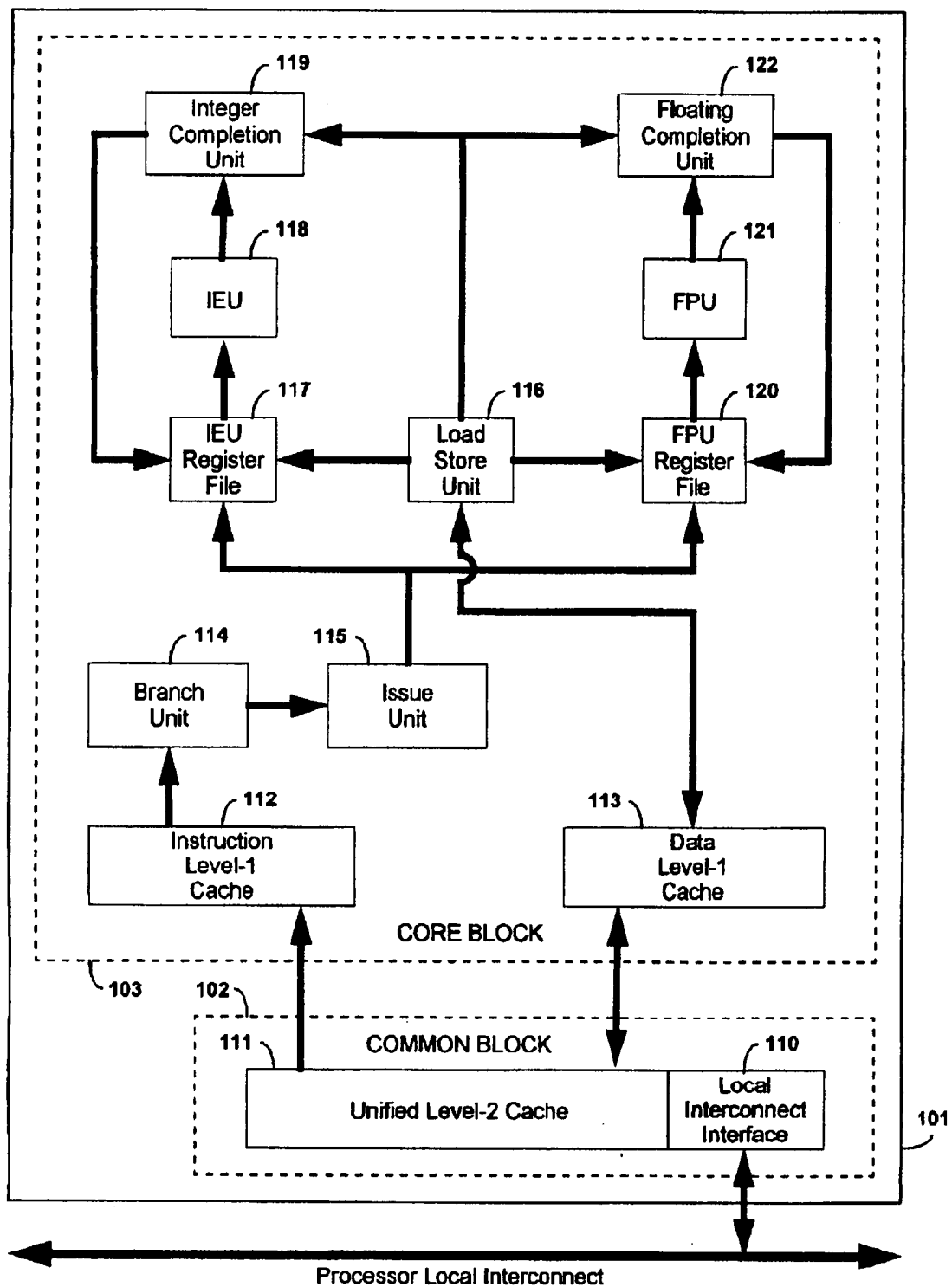
FIG. 1 shows the basic hardware structure of a processor.
Figure 2:
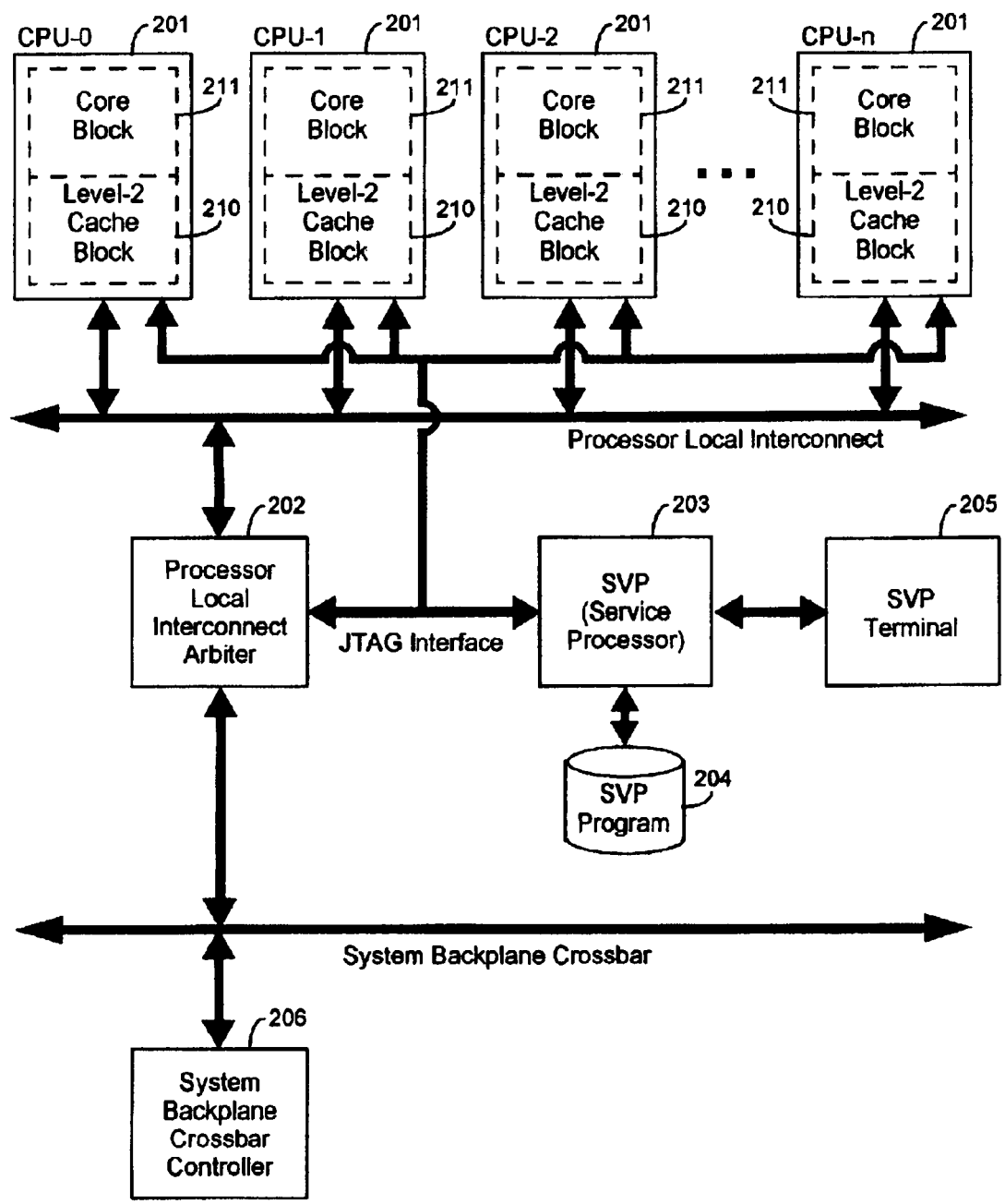
FIG. 2 shows a conventional server system structure that uses symmetric multiprocessors.
Figure 3:
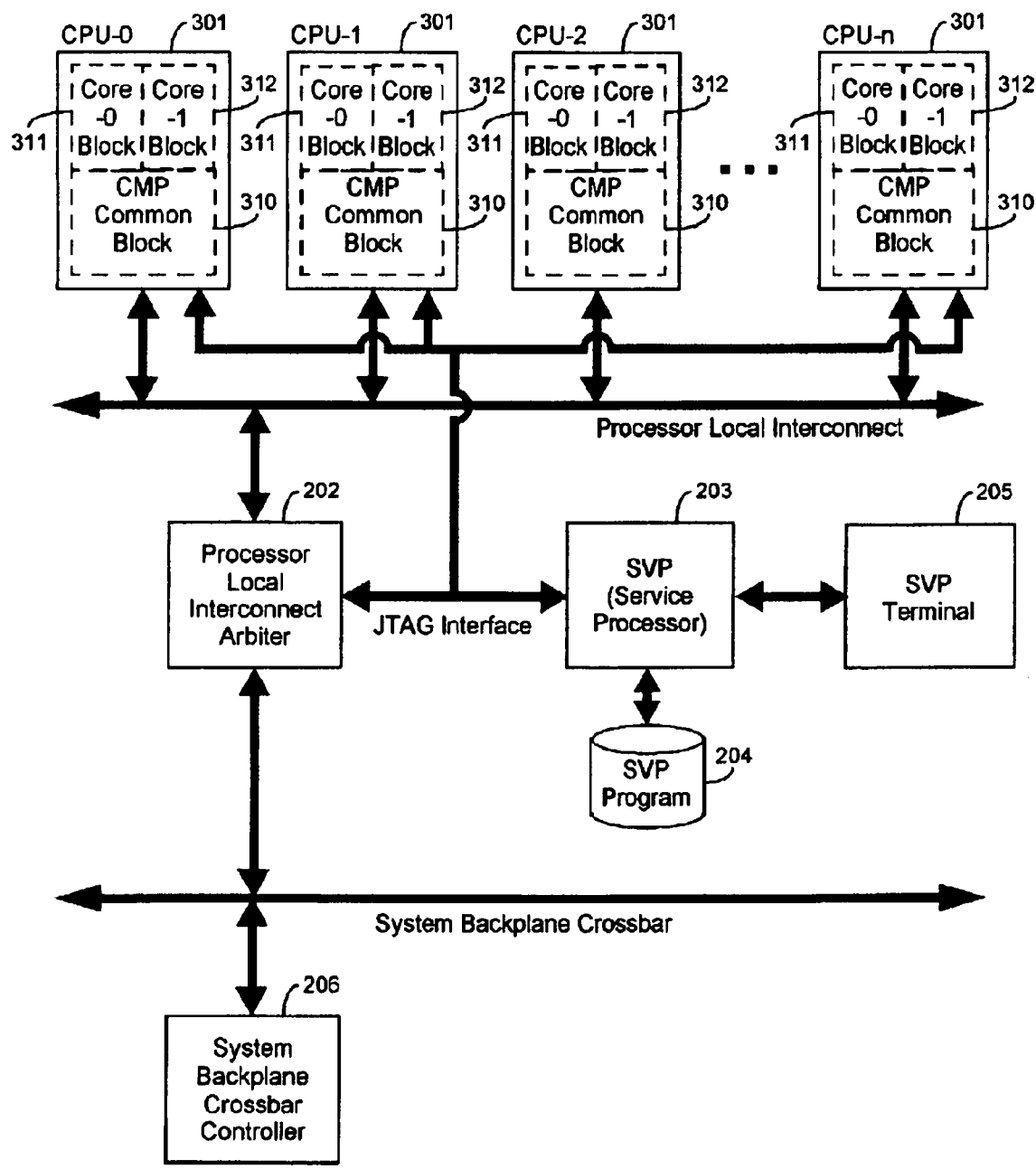
FIG. 3 shows a server system structure that uses multi-core processors.
Figure 4:
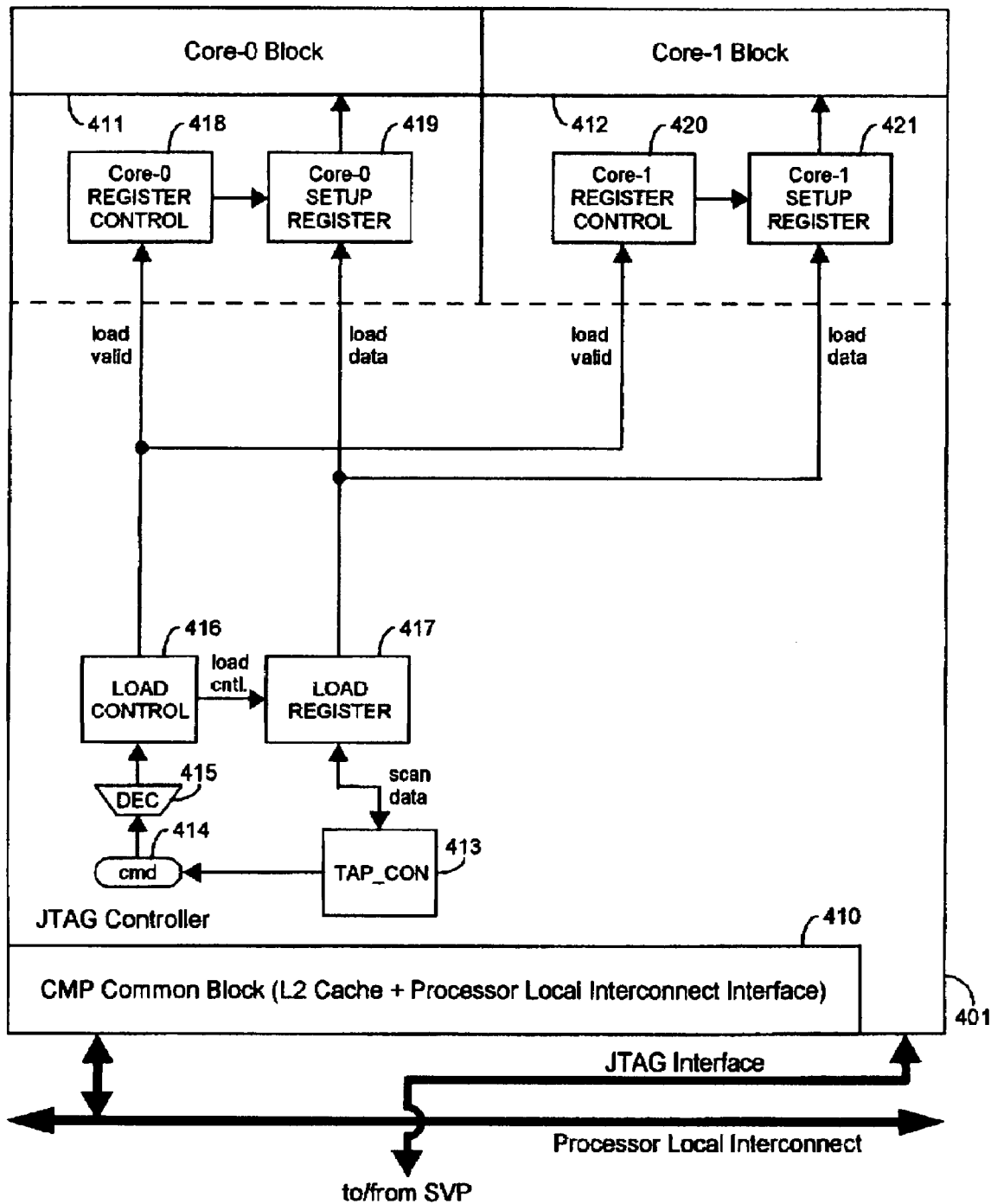
FIG. 4 shows conventional multi-core processor structure number 1.
Figure 5:
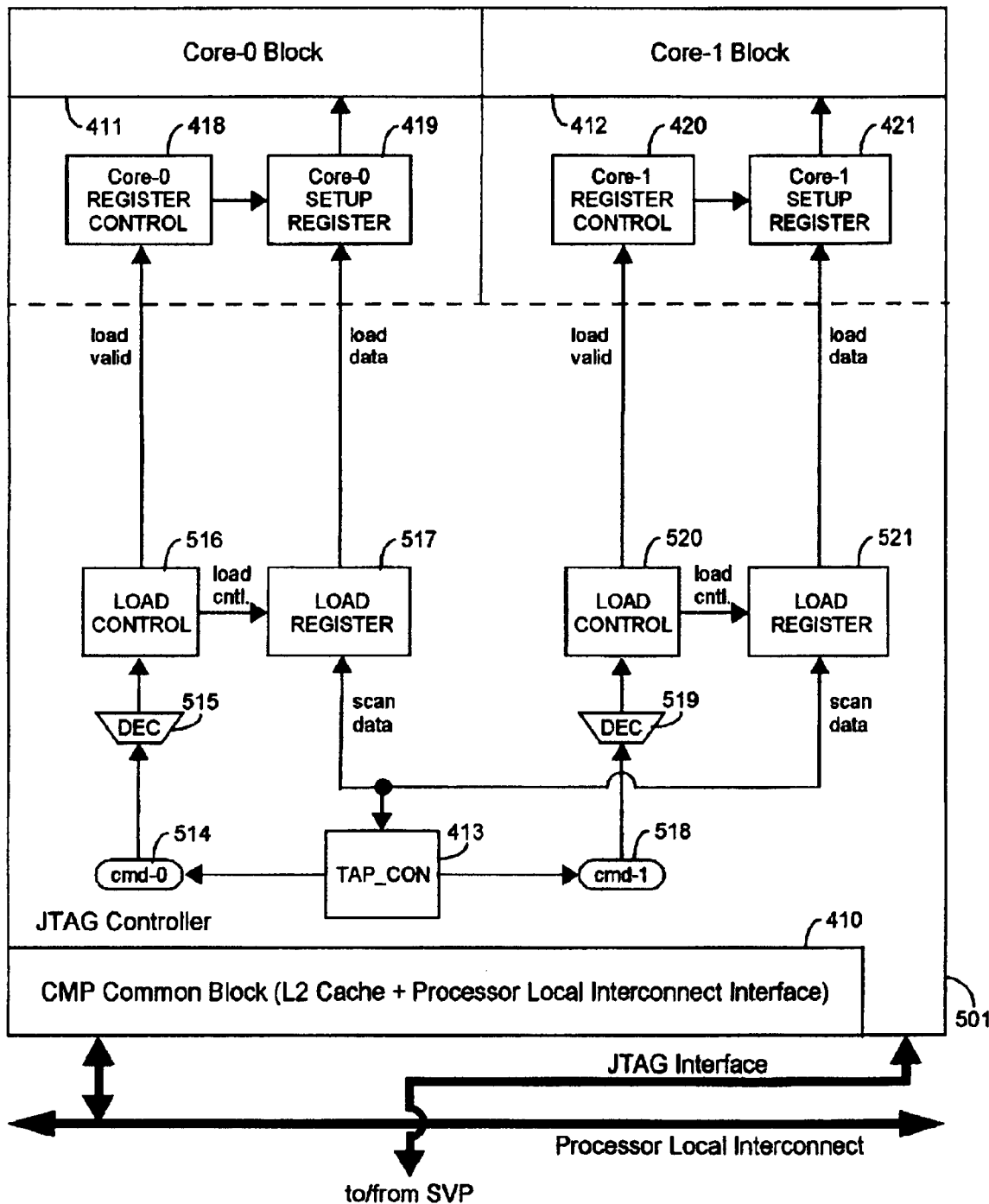
FIG. 5 shows conventional multi-core processor structure number 2.
Figure 6:
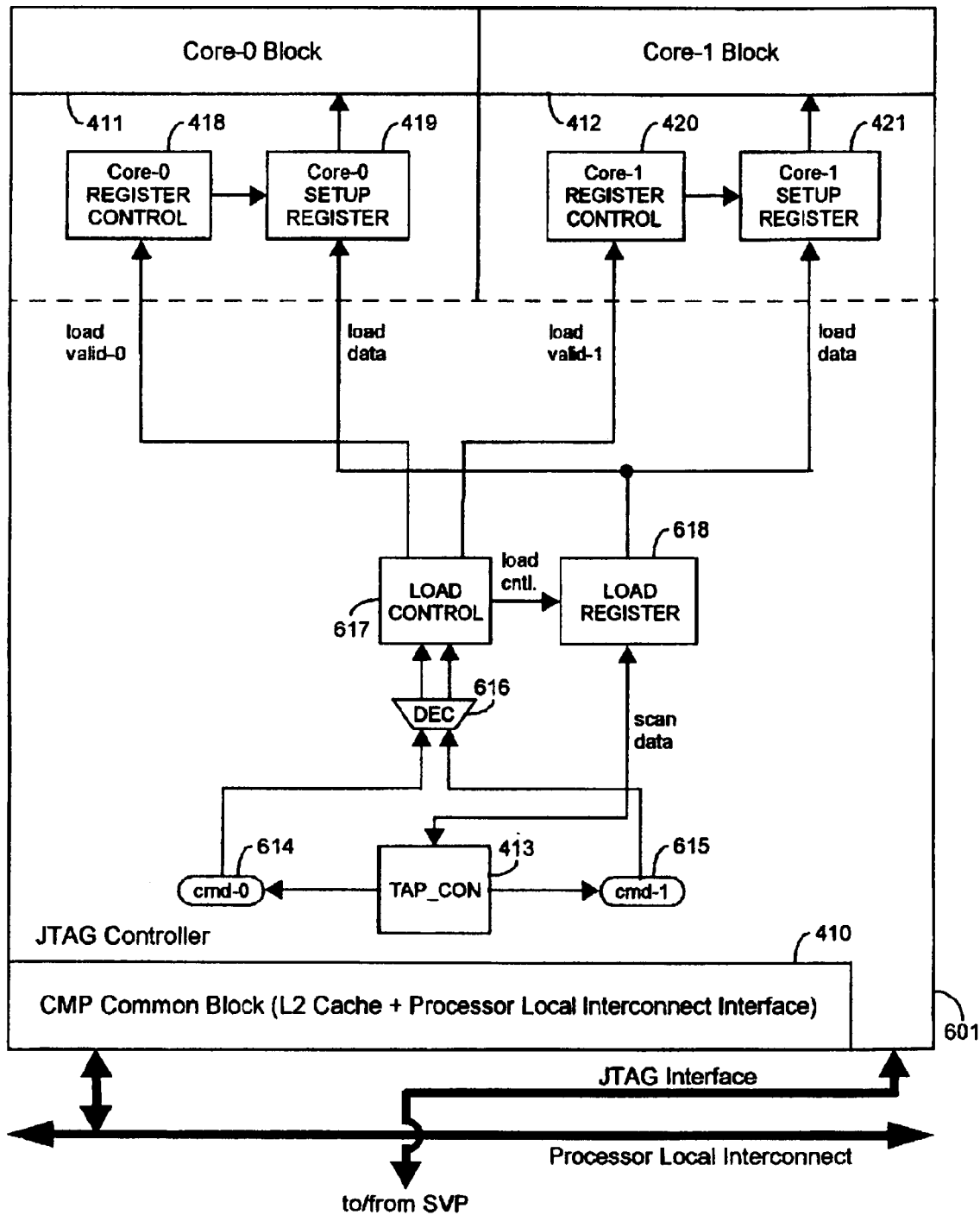
FIG. 6 shows conventional multi-core processor structure number 3.

As explained above, through the present invention, for multi-core processors that are CMP, etc. with multiple processor cores, by supporting a flexible core setting method, a shorter system boot time during multi-core operation, flexible debugging methods, and improvement of yield through the relief of partial core quality chips during semiconductor production can be realized.

From here forward, the first to eighth embodiments of the present invention shall be explained in detail while referring to the drawings.

First Embodiment

Figure 7:
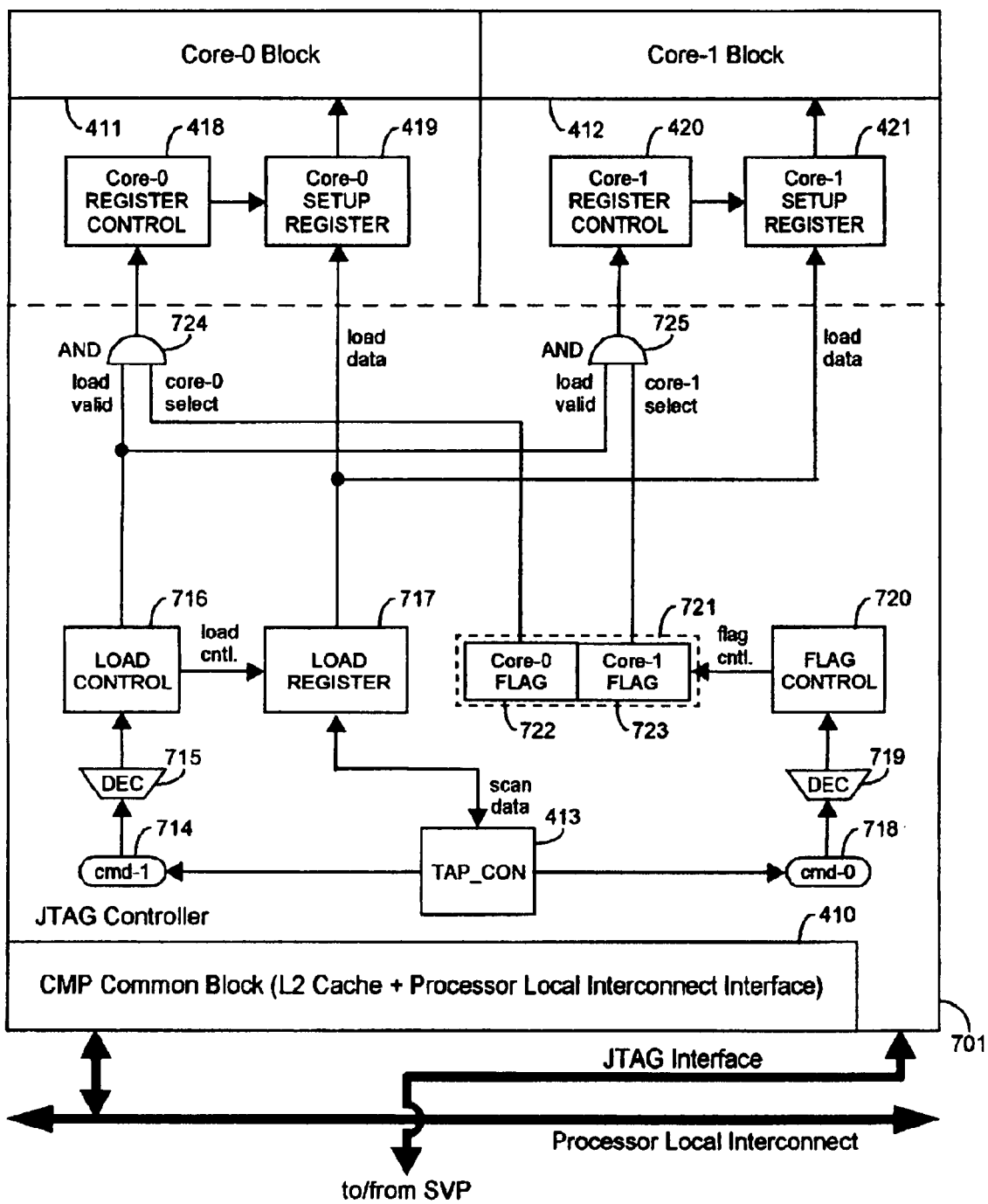
FIG. 7 shows a multi-core processor structure for the first embodiment.

FIG. 7 shows the first embodiment of the present invention with a 2CMP multi-core processor with 2 core portions.

Processor 701 is a 2-core multi-core processor comprised of CORE 0 block 411, CORE 1 block 412, and CMP common block 410. Also, the JTAG controller includes TAP controller 413, decoder for load controller 715, load controller 716, load register 717, decoder for flag controller 719, flag controller 720, core selection flag register 721 comprised of CORE 0 flag register 722 and CORE 1 flag register 723, CORE 0 AND logic gate 724, and CORE 1 AND logic gate 725 each on the CMP common block side, CORE 0 register controller 418 and CORE 0 setup register 419 each on the CORE 0 block side, and CORE 1 register controller 420 and CORE 1 setup register 421 each on the CORE 1 block side.

First, JTAG command-0 718 issued from TAP controller 413 is decoded by decoder for flag controller 719, and through those decoded results, flag controller 720 sets data to CORE 0 flag register 722 and CORE 1 flag register 723 for core selection flag register 721, and performs a selection of the core for load data setting. For example, if settings are to be performed only to CORE 0, CORE 0 flag register 722 is set to "1," and CORE 1 flag register 723 is set to "0." In other words, the selected core has its flag register set to "1" and the core not selected has its flag register set to "0."

Next, TAP controller 413 performs load data settings for the aforementioned selected cores through scan controls for load register 717. Then, JTAG command-1 714 issued from TAP controller 413 is decoded by decoder for load controller 715, and through those decoded results, load controller 716 outputs the load control signal (load valid) to CORE 0 AND logic gate 724 and CORE 1 AND logic gate 725.

Here, the other inputs of the aforementioned CORE 0 AND logic gate 724 and CORE 1 AND logic gate 725 are each connected to the outputs of CORE 0 flag register 722 and CORE 1 flag register 723, and as a result, the load control signal (load valid) output is done only to the aforementioned selected cores. For example, if each sets CORE 0 flag register 722 as "1" and CORE 1 flag register 723 as "0," the aforementioned load control signal (load valid) is only output to CORE 0 register controller 418, and CORE 1 flag register 420 is inhibited by CORE 1 AND logic gate 725, and the aforementioned load control signal (load valid) is not output.

When CORE 0 register controller 418 receives the aforementioned load control signal (load valid), it performs load data settings output from load register 717 to CORE 0 setup register 419.

By means of the above, for the 2CMP multi-core processors with 2 core portions that is the first embodiment of the present invention, the settings only for CORE 0, or settings only for CORE 1, or simultaneous settings for both CORE 0/1 are possible.

Second Embodiment

Figure 8:
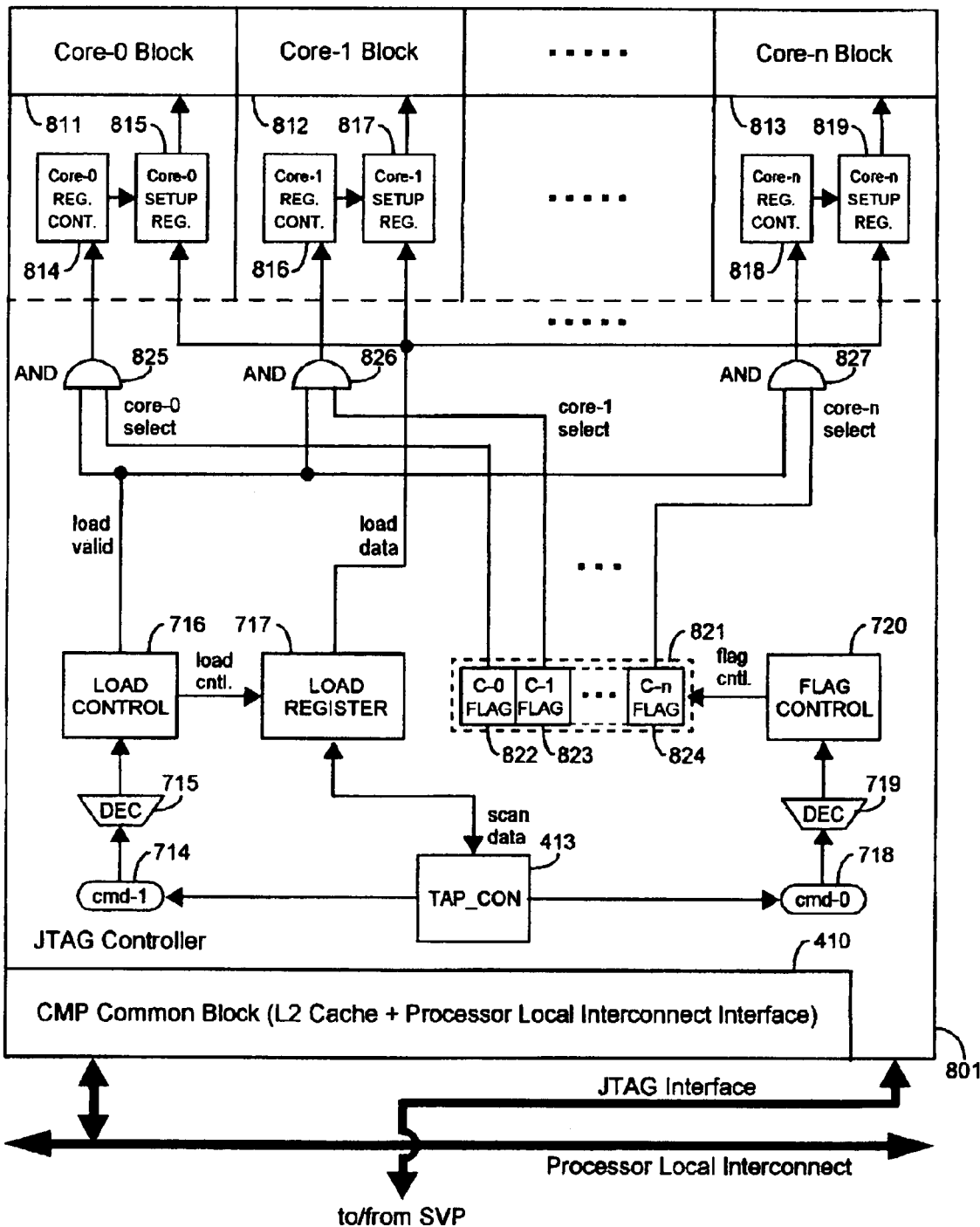
FIG. 8 shows a multi-core processor structure for the second embodiment.

FIG. 8 shows the second embodiment of the present invention with a multi-core processor of nCMP with n number of core portions (n≧3).

Processor 801 is a multi-core processor of n cores comprised of CORE 0 block 811, CORE 1 block 812, . . . , CORE n block 813, and CMP common block 410. Also, the JTAG controller includes TAP controller 413, decoder for load controller 715, load controller 716, load register 717, decoder for flag controller 719, flag controller 720, core selection flag register 821 comprised of CORE 0 flag register 822, CORE 1 flag register 823, . . . , and CORE n flag register 824, CORE 0 AND logic gate 825, CORE 1 AND logic gate 826, . . . , and CORE n AND logic gate 827 each on the CMP common block side, CORE 0 register controller 814 and CORE 0 setup register 815 each on the CORE 0 block side, CORE 1 register controller 816 and CORE 1 setup register 817, . . . , each on the CORE 1 block side, and CORE n register controller 818 and CORE n setup register 819 each on the CORE n block side.

First, JTAG command-0 718 issued from TAP controller 413 is decoded by decoder for flag controller 719, and through those decoded results, flag controller 720 sets data to CORE 0 flag register 822, CORE 1 flag register 823, and . . . CORE n flag register 824 for core selection flag register 821, and performs a selection of the core to have load data set. For example, if settings are to be set only to CORE 0, CORE 0 flag register 822 is set to "1," and CORE 1 flag register 823, . . . , and CORE n flag register 824 are all set to "0." In other words, the flag registers of the cores to be selected are set to "1," and the flag registers of the cores not to be selected are set to "0."

Next, TAP controller 413 sets load data to the aforementioned cores to be selected through scan controls for load register 717. Then, JTAG command-1 714 issued from TAP controller 413 is decoded by decoder for load controller 715, and through those decoded results, load controller 716 outputs the load control signal (load valid) to CORE 0 AND logic gate 825, CORE 1 AND logic gate 826, and . . . CORE n AND logic gate 827.

Here, the other inputs of CORE 0 AND logic gate 825, CORE 1 AND logic gate 826, and . . . CORE n AND logic gate 827 are each connected to the outputs of CORE 0 flag register 822, CORE 1 flag register 823, and . . . CORE n flag register 824, and as a result, the load control signal (load valid) output is done only to the aforementioned selected cores. For example, if each sets CORE 0 flag register 822 as "1," and CORE 1 flag register 823 . . . CORE n flag register 824 as "0," the aforementioned load control signal (load valid) is only output to CORE 0 register controller 814, and CORE 1 flag register 816 . . . CORE n flag register 818 are inhibited by CORE 1 AND logic gate 826, and the aforementioned load control signal (load valid) is not output.

When CORE 0 register controller 814 receives the aforementioned load control signal (load valid), it performs load data settings output from load register 717 to CORE 0 setup register 815.

By means of the above, for the nCMP multi-core processors with n number of core portions (n≧3) that is the first embodiment of the present invention, simultaneous setting for any selected core portions among n number of cores is possible.

Third Embodiment

Figure 9:
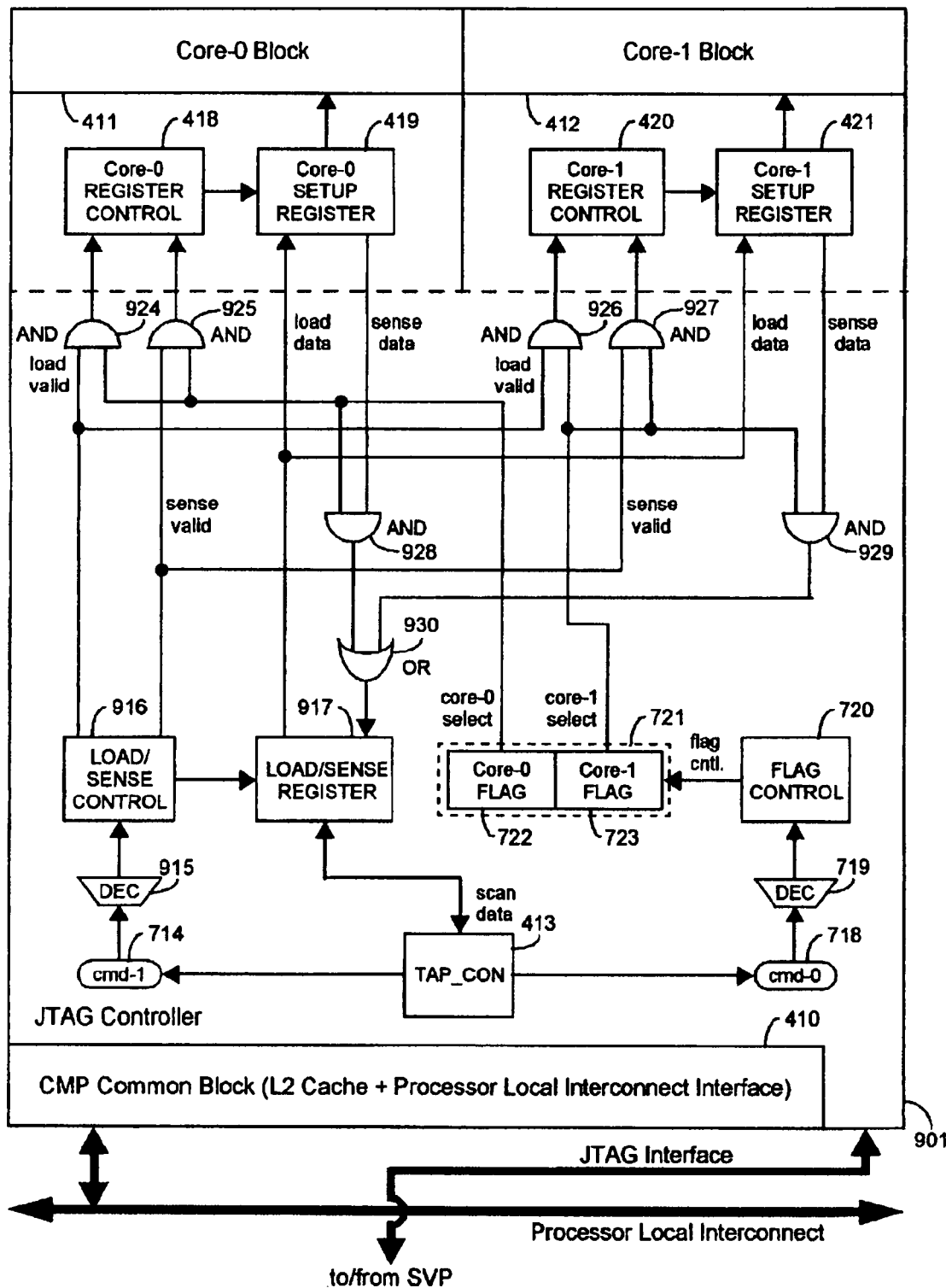
FIG. 9 shows a multi-core processor structure for the third embodiment.

FIG. 9 shows the third embodiment of the present invention with a 2CMP multi-core processor with 2 core portions. The point of difference with the first embodiment indicated in FIG. 7 is that sense controls, in addition to load controls, for the setup registers of both cores are possible. Thus, since the load controls are the same as the first embodiment as indicated in FIG. 7, the load control description shall be omitted, and only the sense controls shall be explained.

Processor 901 is a 2-core multi-core processor comprised of CORE 0 block 411, CORE 1 block 412, and CMP common block 410. Also, the JTAG controller includes TAP controller 413, decoder for load/sense controller 915, load/sense controller 916, load/sense register 917, decoder for flag controller 719, flag controller 720, core selection flag register 721 comprised of CORE 0 flag register 722 and CORE 1 flag register 723, AND logic gate for CORE 0 load controls 924, AND logic gate for CORE 0 sense controls 925, AND logic gate for CORE 1 load controls 926, AND logic gate for CORE 1 sense control 927, AND logic gate for CORE 0 sense data 928, AND logic gate for CORE 1 sense data 929, and OR logic gate for sense data 930 each on the CMP common block side, CORE 0 register controller 418 and CORE 0 setup register 419 each on the CORE 0 block side, and CORE 1 register controller 420 and CORE 1 setup register 421 each on the CORE 1 block side.

First, JTAG command-0 718 issued from TAP controller 413 is decoded by decoder for flag controller 719, and through those decoded results, flag controller 720 sets data to CORE 0 flag register 722 and CORE 1 flag register 723 for core selection flag register 721, and selects the cores to have sense data read. For example, if only CORE 0 is to have data read, CORE 0 flag register 722 is set to "1," and CORE 1 flag register 723 is set to "0." In other words, the flag registers of the cores to be selected are set to "1," and the flag registers of the cores not to be selected are set to "0."

Next, JTAG command-1 714 issued from TAP controller 413 is decoded by decoder for load/sense controller 915, and through those decoded results, load/sense controller 916 outputs the sense control signal (sense valid) to AND logic gate for CORE 0 sense controls 925 and AND logic gate for CORE 1 sense controls 927.

Here, since the other inputs of the aforementioned AND logic gate for CORE 0 sense controls 925 and AND logic gate for CORE 1 sense controls 927 are each connected to the outputs of CORE 0 flag register 722 and CORE 1 flag register 723, as a result, the sense control signal (sense valid) output is done only to the aforementioned cores to be selected. For example, if each sets CORE 0 flag register 722 as "1" and CORE 1 flag register 723 as "0," the aforementioned sense control signal (sense valid) is only output to CORE 0 register controller 418, and CORE 1 register controller 420 is inhibited by AND logic gate for CORE 1 sense control 725, and the aforementioned sense control signal (sense valid) is not output.

When CORE 0 register controller 418 receives the aforementioned sense control signal (sense valid), the set data on CORE 0 setup register 419 is output as sense data. The sense data output from the aforementioned CORE 0 setup register 419 is input to AND logic gate for CORE 0 sense data 928, but since the other input of the aforementioned AND logic gate for sense data 928 is connected to the output of CORE 0 flag register 722, the data is input to the OR logic gate for sense data as a result. Meanwhile, the output from CORE 1 setup register 421 is input to AND logic gate for CORE 1 sense data 929, but since the other input of the aforementioned AND logic gate for CORE 1 sense data 929 is connected to the output of CORE 1 flag register 723, the output is inhibited. Thus, the output from OR logic gate for sense data 930 has data set on CORE 0 setup register 419 output as sense data to load/sense register 917. Next, TAP controller 413 reads the sense data from the aforementioned core to be selected through scan control towards load/sense register 917.

By means of the above, for a 2CMP multi-core processor with 2 core portions that is the third embodiment of the present invention, the reading of sense data from CORE 0 or the reading of sense data from CORE 1 is possible.

Fourth Embodiment

Figure 10:
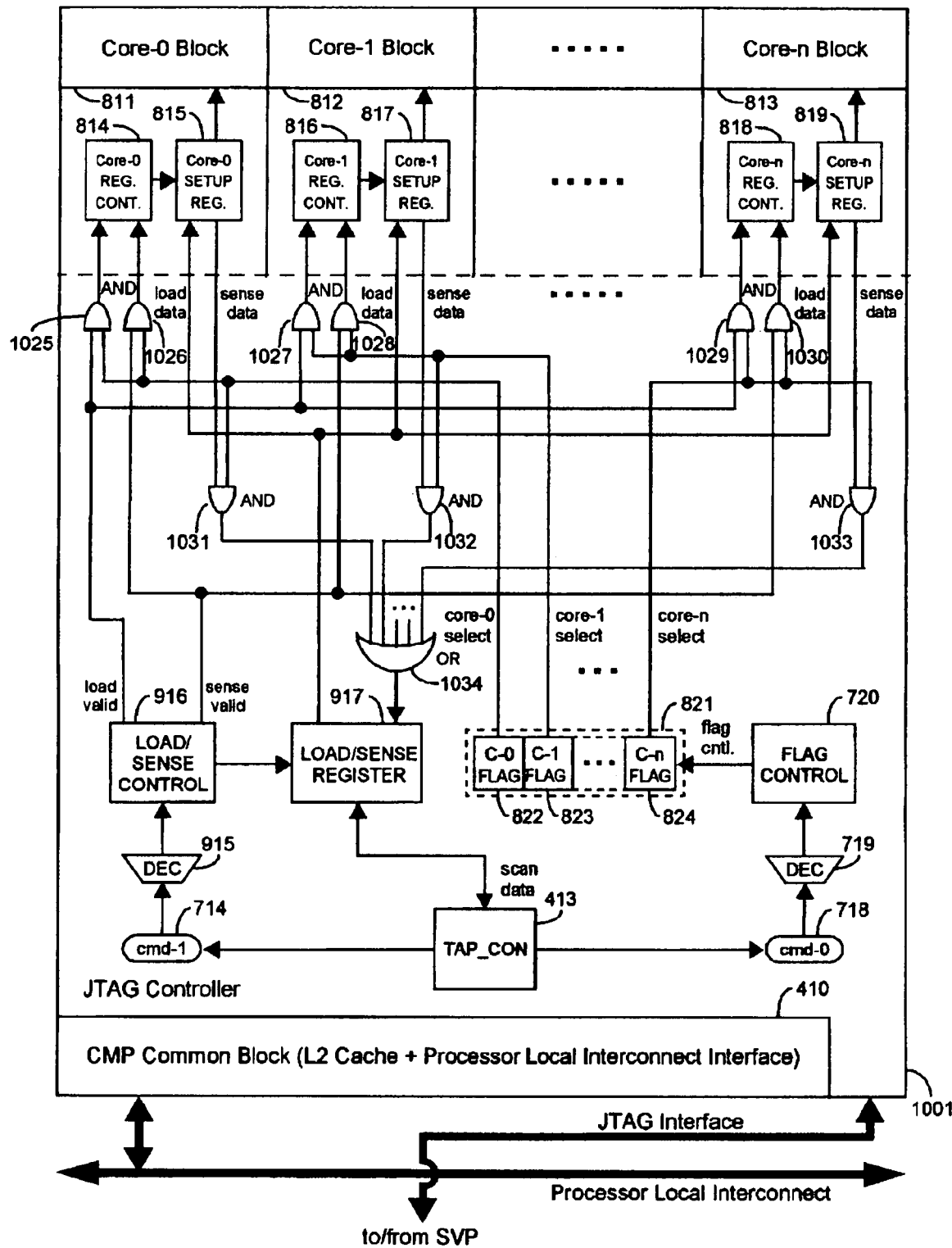
FIG. 10 shows a multi-core processor structure for the fourth embodiment.

FIG. 10 shows the fourth embodiment of the present invention with an nCMP multi-core processor with n number of core portions (n≧3). The points of difference with the second embodiment indicated in FIG. 8 is that sense controls, as well as load controls, for the setup registers of n number of cores are possible. Thus, since the load controls are the same as the second embodiment indicated in FIG. 8, the load control description shall be omitted, and only the sense controls shall be explained.

Processor 1001 is a multi-core processor with n number of cores comprised of CORE 0 block 811, CORE 1 block 812, . . . , CORE n block 813, and CMP common block 410. Also, the JTAG controller includes TAP controller 413, decoder for load/sense controller 915, load/sense controller 916, load/sense register 917, decoder for flag controller 719, flag controller 720, core selection flag register 821 comprised of CORE 0 flag register 822, CORE 1 flag register 823, and . . . CORE n flag register 823, AND logic gate for CORE 0 load controls 1025, AND logic gate for CORE 1 load controls 1027, . . . , AND logic gate for CORE n load controls 1029, AND logic gate for CORE 0 sense controls 1026, AND logic gate for CORE 1 sense controls 1028, . . . , AND logic gate for CORE n sense controls 1030, AND logic gate for CORE 0 sense data 1031, AND logic gate for CORE 1 sense data 1032, AND logic gate for CORE n sense data 1033, and OR logic gate for sense data 1034 each on the CMP common block side, CORE 0 register controller 814 and CORE 0 setup register 815 each on the CORE 0 block side, and CORE 1 register controller 816, CORE 1 setup register 817, . . . , each on the CORE 1 block side, and CORE n register controller 818 and CORE n setup register 819 each on the CORE n block side.

First, JTAG command-0 718 issued from TAP controller 413 is decoded by decoder for flag controller 719, and through those decoded results, flag controller 720 sets data to CORE 0 flag register 822, CORE 1 flag register 823, and . . . CORE n flag register 824 for core selection flag register 821, and selects the cores to have sense data read. For example, if settings are performed only on CORE 0, CORE 0 flag register 822 is set to "1," and CORE 1 flag register 823, . . . , and CORE n flag register 824 are set to "0." In other words, flag registers of cores to be selected are set to "1," and flag, registers of cores not to be selected are set to "0."

Next, JTAG command-1 714 issued from TAP controller 413 is decoded by decoder for load/sense controller 915, and through those decoded results, load/sense controller 916 outputs the sense control signal (sense valid) to AND logic gate for CORE 0 sense controls 1025, AND logic gate for CORE 1 sense controls 1027, and . . . AND logic gate for CORE n sense controls 1029.

Here, since the other inputs of the aforementioned AND logic gate for CORE 0 sense controls 1026, AND logic gate for CORE 1 sense controls, 1028 and . . . AND logic gate for CORE n sense controls 1030 are connected to the outputs of CORE 0 flag register 822, CORE 1 flag register 823, and . . . CORE n flag register 824, as a result, the sense control signal (sense valid) is output only to the aforementioned cores to be selected. For example, if each sets CORE 0 flag register 822 to "1," CORE 1 flag register 823 to "0," . . . , and CORE n flag register 824 to "0," the aforementioned sense control signal (sense valid) is output only to CORE 0 register controller 814, and CORE 1 register controller 816, . . . , CORE n register controller 818 are inhibited by AND logic gate for CORE 1 sense controls 1028, . . . , and AND logic gate for CORE n sense control 1030, and the aforementioned sense control signal (sense valid) is not output.

When CORE 0 register controller 814 receives the aforementioned sense control signal (sense valid), the data set to CORE 0 setup register 815 is output as sense data. The sense data output from the aforementioned CORE 0 setup register 815 is input to AND logic gate for CORE 0 sense data 1031, but the other input of the aforementioned AND logic gate for sense data 1031 is connected to the output of CORE 0 flag register 822, and is input to the OR logic gate for sense data as a result. Meanwhile, output from each of CORE 1 setup register 817, . . . , and CORE n setup register 819 are each input to AND logic gate for CORE 1 sense data 1032, . . . , and AND logic gate for CORE n sense data 1033, but the other inputs of each of the aforementioned AND logic gate for CORE 1 1032, . . . , and AND logic gate for CORE n sense data 1033 are respectively connected to the outputs of CORE 1 flag register 823, . . . , CORE n flag register 824, and the output is inhibited. Thus, the output from OR logic gate for sense data 930 has the data set to CORE 0 setup register 815 output to load/sense register 917 as sense data. Next, TAP controller 413 reads sense data from the aforementioned core to be selected through scan controls towards load/sense register 917.

By means of the above, for an nCMP multi-core processor with n number of core portions (n≧3) that is the fourth embodiment of the present invention, the reading of sense data from any selected core among n number of core portions is possible.

Fifth Embodiment

Figure 11:
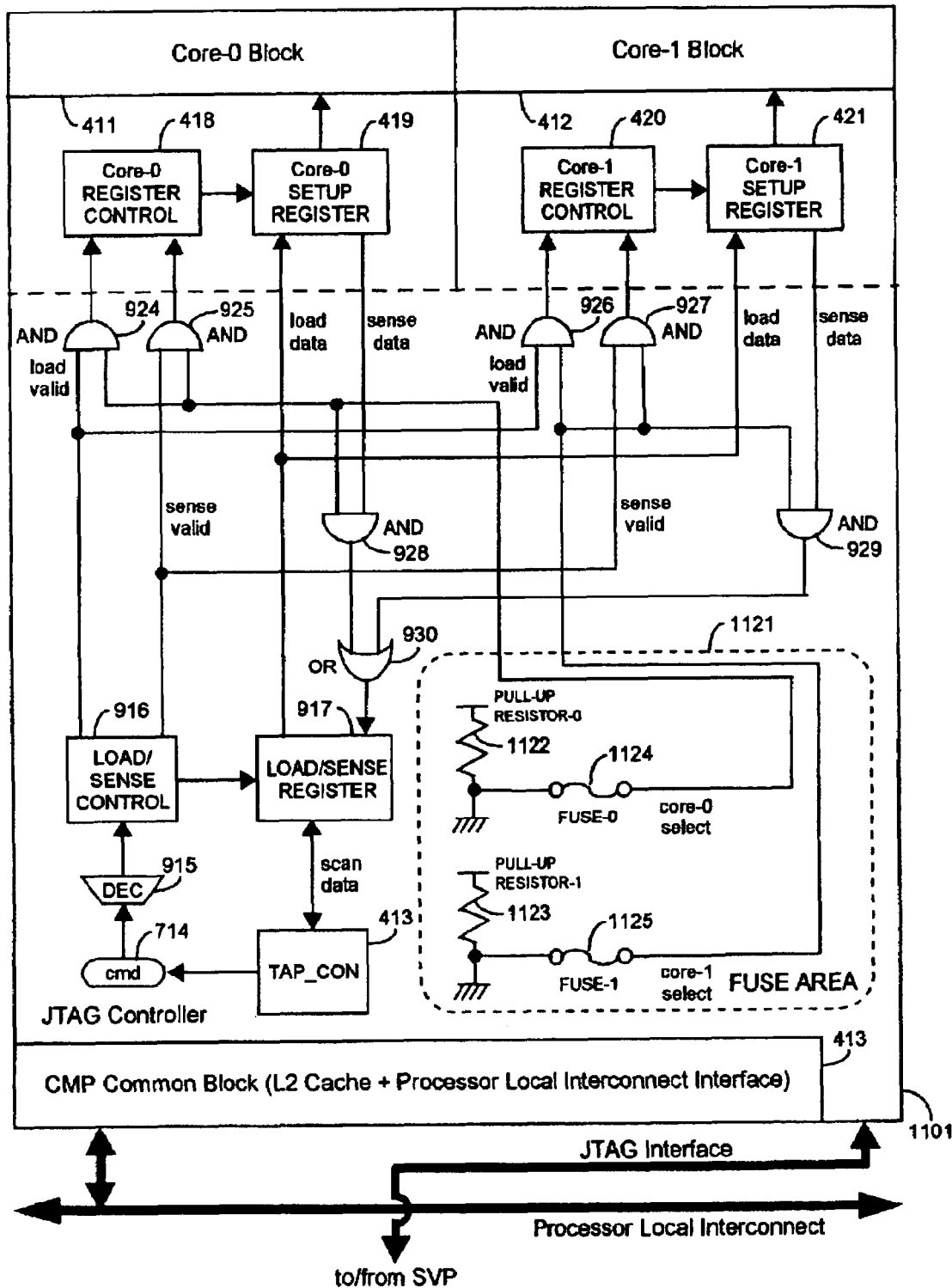
FIG. 11 shows a multi-core processor structure for the fifth embodiment.

FIG. 11 shows the fifth embodiment of the present invention with a 2CMP multi-core processor with 2 core portions. The point of difference with the third embodiment indicated in FIG. 9 is that core selection is done by fuse rather than a core selection flag register. Thus, since the load/sense controls are the same as those of the third embodiment indicated in FIG. 9, the load/sense control descriptions shall be omitted, and only the fuse settings shall be explained.

Processor 1101 has fuse area 1121 in the place of a core selection flag register, and the aforementioned fuse area 1121 is comprised of pull up resistance for CORE 0 1122, pull up resistance for CORE 1 1123, fuse for CORE 0 1124, and fuse for CORE 1 1125. The aforementioned fuse for CORE 0 1124 and fuse for CORE 1 1125 have the same effect as when a core selection register is set with a fixed value by performing settings through laser cutting during semiconductor production.

By means of the above, for a 2CMP multi-core processor with 2 core portions that is the fifth embodiment of the present invention, load/sense controls can be performed in stable condition on the quality core side by cutting the fuse of the defective core side of a chip determined to be a partial core quality product through a wafer test at the time of semiconductor production.

Sixth Embodiment

Figure 12:
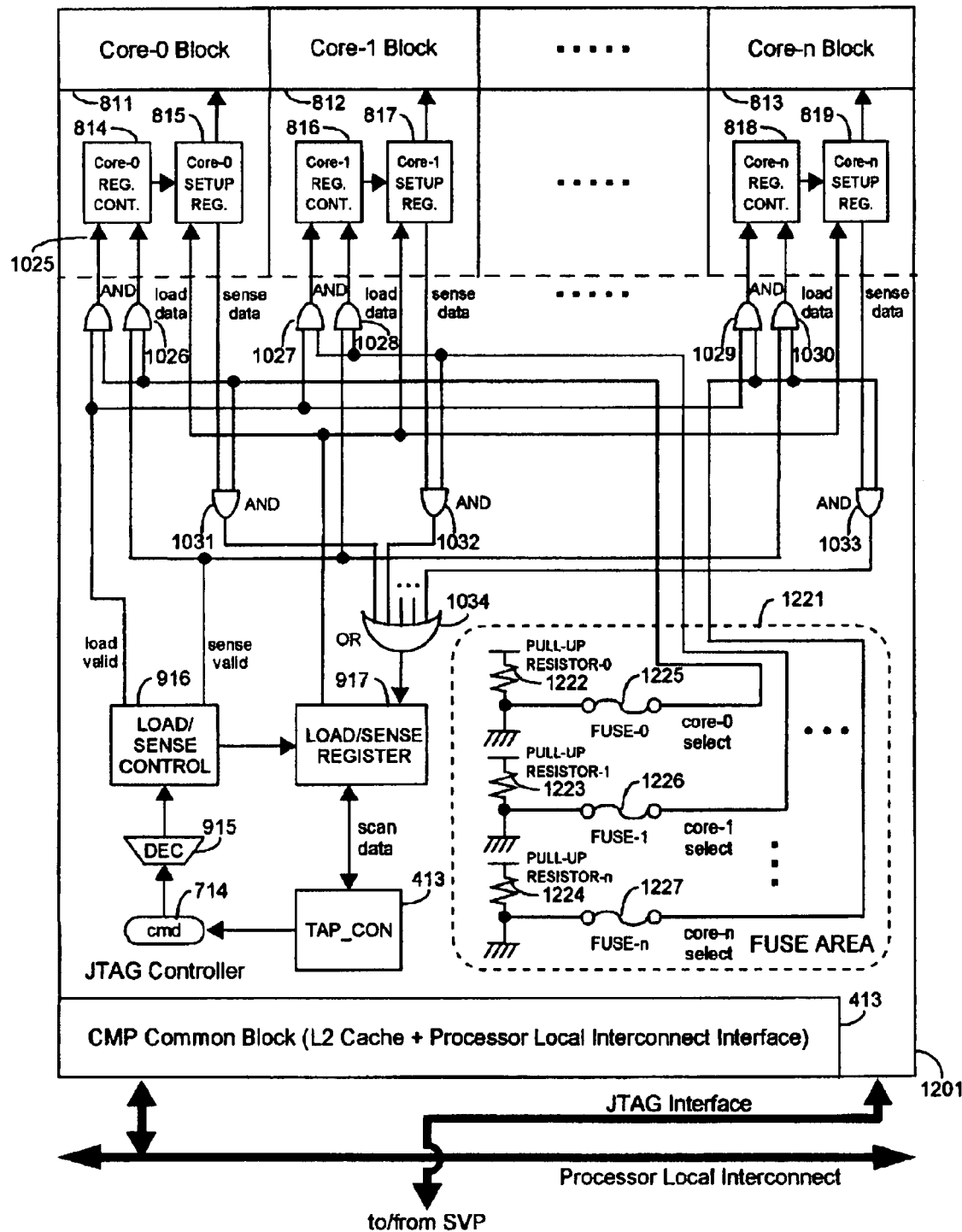
FIG. 12 shows a multi-core processor structure for the sixth embodiment.

FIG. 12 shows the sixth embodiment of the present invention with an nCMP multi-core processor with n number of core portions (n≧3). The point of difference with the fourth embodiment as indicated in FIG. 10 is that core selection is done by fuse rather than a core selection flag register. Thus, since the load/sense controls are the same as those of the fourth embodiment indicated in FIG. 10, the load/sense control descriptions shall be omitted, and only the fuse settings shall be explained.

Processor 1201 has fuse area 1221 in the place of a core selection flag register, and the aforementioned fuse area 1221 is comprised of pull up resistance for CORE 0 1222, pull up resistance for CORE 1 1223, . . . , pull up resistance for CORE n 1224, fuse for CORE 0 1225, fuse for CORE 1 1226, . . . , and fuse for CORE n 1227. The aforementioned fuse for CORE 0 1225, fuse for CORE 1 1226, and fuse for CORE n 1227 have the same effect as when a core selection register is set with a fixed value by performing settings through laser cutting during semiconductor production.

By means of the above, for a 2CMP multi-core processor with n number of cores (n≧3) that is the sixth embodiment of the present invention, load/sense controls can be performed in a stable condition on the quality core side by cutting the fuse of the defective core side on a chip determined to be a partial core quality product through a wafer test at time of semiconductor production.

Seventh Embodiment

Figure 13:
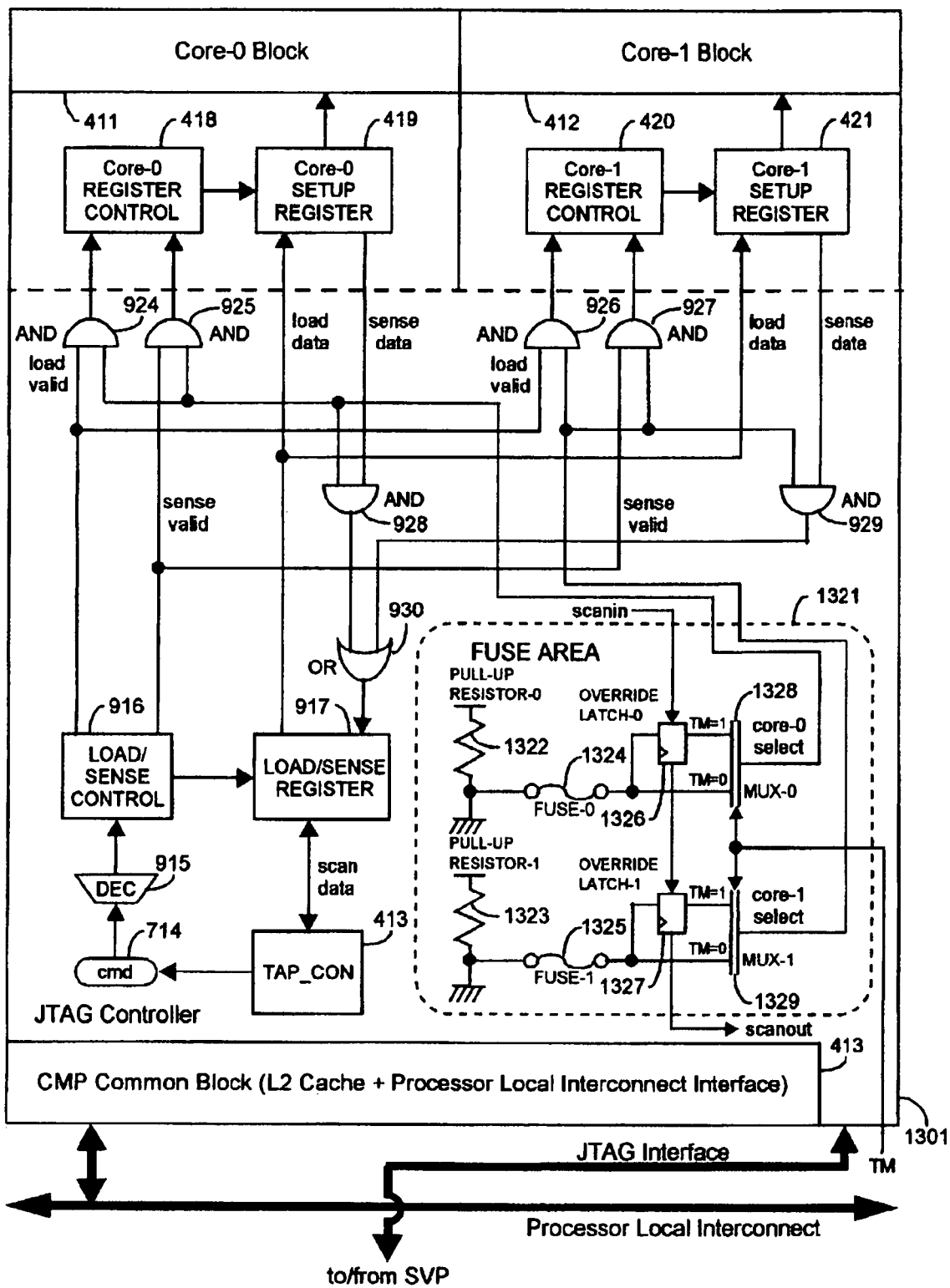
FIG. 13 shows a multi-core processor structure for the seventh embodiment.

FIG. 13 shows the seventh embodiment of the present invention with a 2CMP multi-core processor with 2 core portions. The point of difference with the fifth embodiment indicated in FIG. 11 is that core selection can be freely executed by setting core selection data to the fuse overwrite scan register even after the fuse has been cut. Thus, since the load/sense controls are the same as those of the fifth embodiment indicated in FIG. 11, the load/sense control descriptions shall be omitted, and only the fuse settings shall be explained.

Processor 1301 has fuse area 1321 in the place of a core selection flag register, and the aforementioned fuse area 1321 is comprised of pull up resistance for CORE 0 1322, pull up resistance for CORE 1 1323, fuse for CORE 0 1324, fuse for CORE 1 1325, fuse overwrite scan register for CORE 0 1326, fuse overwrite scan register for CORE 1 1327, selector for CORE 0 1328, and selector for CORE 1 1329. By performing settings through laser cutting during semiconductor production, the aforementioned fuse for CORE 0 1324 and fuse for CORE 1 1325 have the same effect as when a core selection register is set with a fixed value. Also, for the aforementioned fuse for CORE 0 1324 and fuse for CORE 1 1325, core selection data settings are done through scan controls by TAP controller 413, and by performing selection controls from the external pin through TM (Test Mode) signals as selection signals of selector for CORE 0 1328 and selector for CORE 1 1329 respectively, line tacking of the core portion can be freely done even after the fuse has been cut.

By means of the above, for a 2CMP multi-core processor with 2 core portions that is the seventh embodiment of the present invention, the core portion that corresponds to load/sense controls can be freely selected even after the fuse of the defective core side has been cut of a chip determined to be a partial core quality product through a wafer test at time of semiconductor production.

Eighth Embodiment

Figure 14:
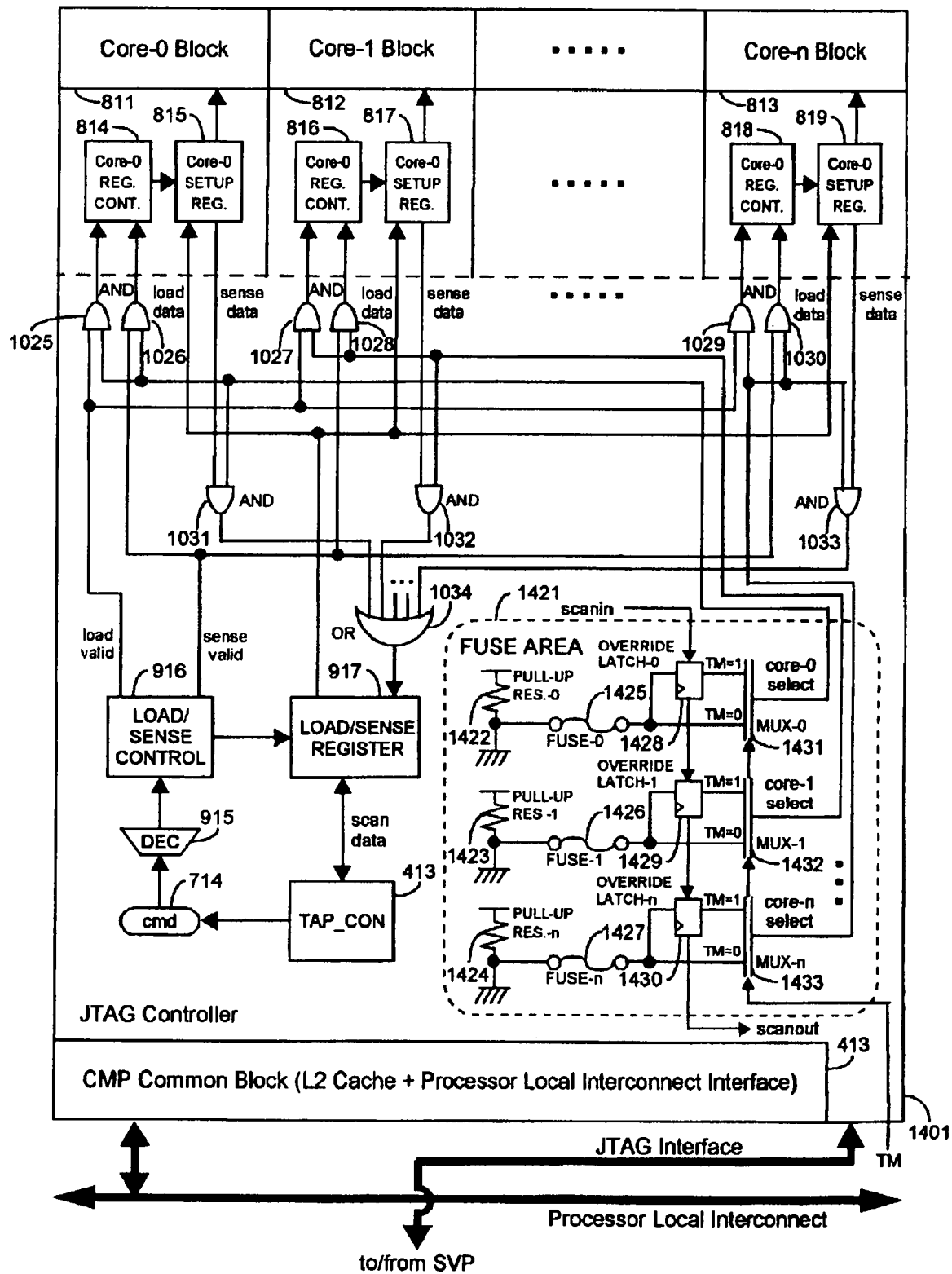
FIG. 14 shows a multi-core processor structure for the eighth embodiment.

FIG. 14 shows the eighth embodiment of the present invention with an nCMP multi-core processor with n number of core portions (n≧3). The point of difference with the sixth embodiment shown in FIG. 12 is that even after the fuse has been cut, the core portion can be freely selected by setting the core selection data to the fuse overwrite scan register. Thus, since the load/sense controls are the same as those of the sixth embodiment indicated in FIG. 12, the load/sense control descriptions shall be omitted, and only the fuse overwrite scan register settings shall be explained.

Processor 1401 has fuse area 1421 in the place of a core selection flag register, and the aforementioned fuse area 1421 is comprised of pull up resistance for CORE 0 1422, pull up resistance for CORE 1 1423, . . . , pull up resistance for CORE n 1424, fuse for CORE 0 1425, fuse for CORE 1 1426, . . . , fuse for CORE n 1427, fuse overwrite scan register for CORE 0 1428, fuse overwrite scan register for CORE 1 1429, . . . , fuse overwrite scan register for CORE n 1430, selector for CORE 0 1431, selector for CORE 1 1432, . . . , and selector for CORE n 1433. By performing settings through laser cutting during semiconductor production, the aforementioned fuse for CORE 0 1425, fuse for CORE 1 1426, and fuse for . . . CORE n 1427 have the same effects as when a fixed value is set to the core selection register. Also, settings through scan controls of the core selection data are done by TAP controller 413 on the aforementioned fuse for CORE 0 1425, fuse for CORE 1 1426, and fuse for . . . CORE n 1427, and by performing selection controls from the external pin through TM (Test Mode) signals, respectively as select signals for selector for CORE 0 1431, selector for CORE 1 1432, . . . , selector for CORE n 1433, line tacking of the core portion can be freely done even after the fuse has been cut.

Figure 15:
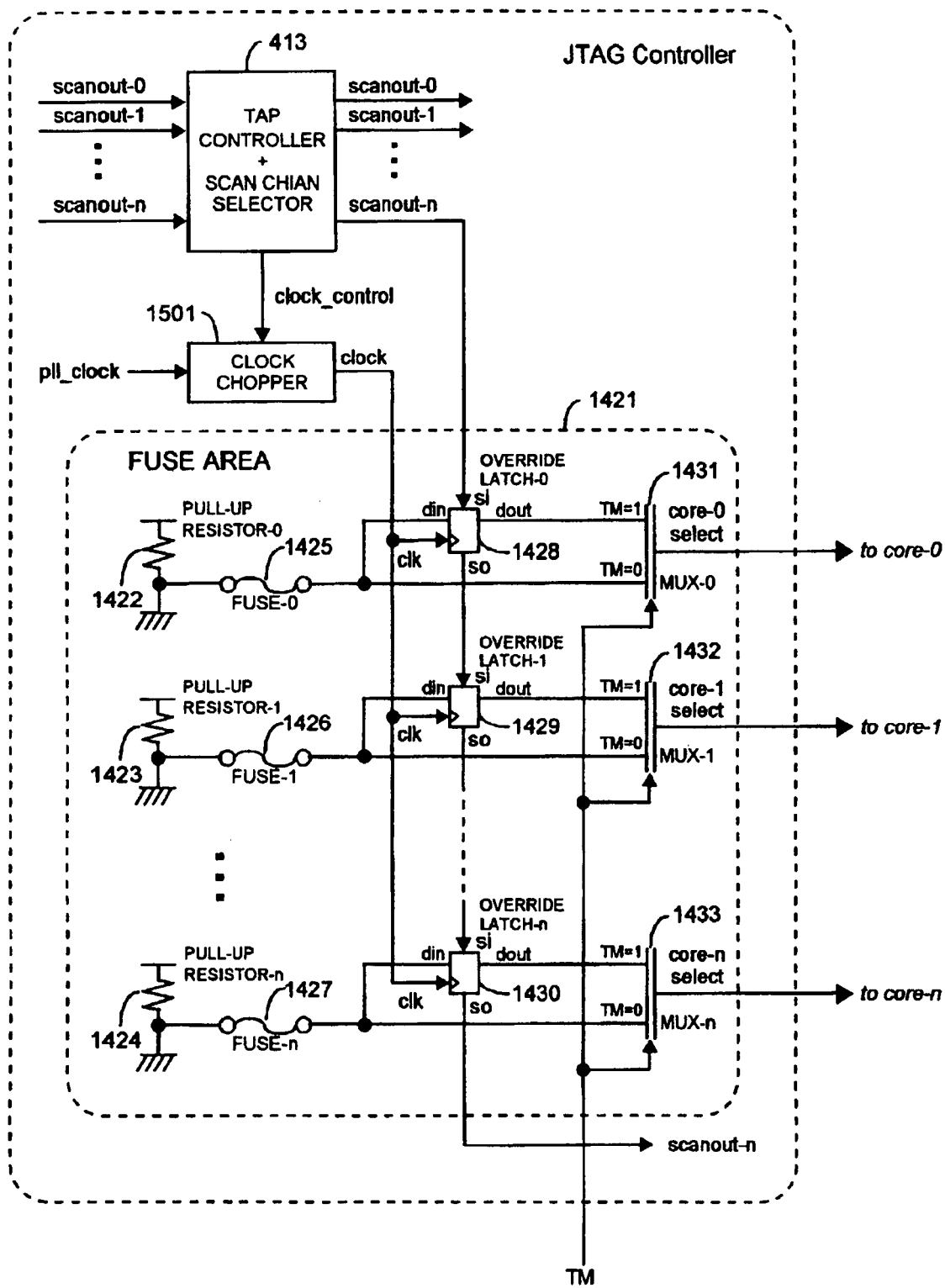
FIG. 15 shows the multi-core processor's fuse portion structure for the eighth embodiment.

In addition, FIG. 15 shows in detail the connection between the aforementioned fuse are 1421 and the aforementioned TAP controller 413. Clock chopper 1501 provides a system clock during normal operation, and performs controls that stop the system clock during scan operation, for fuse overwrite scan register for CORE 0 1428, fuse overwrite scan register for CORE 1 1429, . . . , fuse overwrite scan register for CORE n 1430.

By means of the above, for an nCMP multi-core processor with n number of core portions (n≧3) that is the eighth embodiment of the present invention, even if a fuse of the defective core side is cut on a chip determined to be a partial core quality product from a wafer test at time of semiconductor production, the selection of the core portion that corresponds to load/sense controls can be done freely.

Embodiments 1-8 of the present invention have been described with reference to the drawings, but general structural examples are not limited to these Embodiments 1-8, and the present invention shall include design changes, etc. within a scope that does not depart from the gist of the present invention.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A processor comprising:
a logic block comprising a plurality of execution processing cores that are configured to operate individually and each having an internal setting register;
a data register configured to maintain setting information for the internal setting register of each of the plurality of execution processing cores;
a sense controller configured to perform sense control of the setting information and to maintain the internal setting register of each of the plurality of execution processing cores;
a cores selection fuse device configured to set selection information of each of the plurality of execution processing cores;
an interceptor configured to intercept a sense control signal to the internal setting register of each of the plurality of execution processing cores from the sense controller according to a value from the core selection fuse device;
a fuse overwrite scan latch configured to overwrite a content of the core selection fuse device by connecting to an output of the core selection fuse device, and to scan setting new core selection information through a TAP controller configured to perform scan controls; and
a selector being configured to make the output of the core selection fuse device, or an output of the fuse overwrite scan latch, become the input.

2. A processor comprising:
a plurality of logic blocks for processors comprising a primary execution processing cores configured to operate individually and each having an internal setting register, a plurality of common block portions with cache means that are shared by the primary of execution processing core and said secondary execution processing core;
a TAP controller being configured to perform processor control by issuing JTAG commands;
a data register configured to maintain setting information for a setting register of the plurality of execution processing cores;
a load controller configured to perform load control of data maintained by the data register for a setting register of the primary execution processing cores, by connecting to the data register;
a core selection fuse device configured to maintain selection information of the primary execution processing cores for each execution processing core;
an interceptor configured to intercept a load control signal to the setting register of each of the plurality of execution processing cores from the load controller according to the value of the core selection fuse device;
a fuse overwrite scan latch configured to overwrite an output of the core selection fuse device by connecting to an output of the core selection fuse device and to set the core selection information from scan settings of the TAP controller; and
a selector configured to make the output of the core selection fuse device, or an output of the fuse overwrite scan latch, the input.

3. A processor comprising:
a plurality of logic blocks for processors comprising a plurality of execution processing cores configured to operate individually and each having an internal setting register, a plurality of common block portions with cache means that are shared by said plurality of execution processing cores;
a TAP controller configured to perform processor control by issuing JTAG commands;
a data register configured to maintain setting information for a setting register of the plurality of execution processing cores;
a first load controller configured to perform load control of data maintained by the data register for the setting register of the plurality of execution processing cores, by connecting to the data register;
a core selection fuse device configured to maintain selection information of the plurality of execution processing cores for each execution processing core;
a first selector configured to select one of the plurality of execution processing cores by setting core selection information by cutting the core selection fuse device;
a device configured to set setting information for one of the plurality of execution processing cores through scan settings for the data register from the TAP controller; and
a second load controller configured to load data register contents to the setting register of the appropriately selected execution processing core by issuing a JTAG command for the second load controller from the TAP controller;
a fuse overwrite scan latch configured to overwrite an output of the core selection fuse device by connecting to an output of the core selection fuse device and to set the core selection information from scan settings of the TAP controller; and
a second selector operable to make the output of the core selection fuse device, or an output of the fuse overwrite scan latch, the input.

4. A processor comprising:
a plurality of logic blocks for processors comprising a plurality of execution processing cores configured to operate individually and each having an internal setting register, a plurality of common block portions with cache means that are shared by said plurality of execution processing cores;
a TAP controller configured to perform processor control by issuing JTAG commands;
a data register configured to maintain setting information for a setting register of the plurality of execution processing cores;
a first load controller configured to perform load control of data maintained by the data register for the setting register of the plurality of execution processing cores, by connecting to the data register;
a core selection fuse device configured to maintain selection information of the plurality of execution processing cores for each execution processing core;
a first selector configured to select one of the plurality of execution processing cores by setting core selection information by cutting the core selection fuse device;
a device configured to set setting information for one of the plurality of execution processing cores through scan settings for the data register from the TAP controller;
a second load controller configured to load data register contents to the setting register of the appropriately selected execution processing core by issuing a JTAG command for the second load controller from the TAP controller; and
a fuse overwrite scan latch operable to overwrite an output of the core selection fuse device by connecting to an output of the core selection fuse device, and setting said core selection information through scan setting from the TAP controller; and
a second selector operable to make the output of the core selection fuse device, or the output from the fuse overwrite scan latch, the input.

5. A processor comprising:
a plurality of logic blocks for processors comprising a plurality of execution processing cores configured to operate individually and each having an internal setting register, a plurality of common block portions with cache means that are shared by said plurality of execution processing cores;
a TAP controller configured to perform processor control by issuing JTAG commands;
a data register configured to maintain setting formation for a setting register of the plurality of execution processing cores;
a first load controller configured to perform load control of data maintained by the data register for the setting register of the plurality of execution processing cores, by connecting to the data register;
a core selection fuse device operable to maintain selection information of the plurality of execution processing cores for each execution processing core;
a selector configured to select one of the plurality of execution processing cores by setting core selection information by cutting the core selection fuse device;
a device configured to set setting information for one of the plurality of execution processing cores through scan settings for the data register from the TAP controller;
a second load controller configured to load data register contents to the setting register of the appropriately selected execution processing core by issuing a JTAG command for the second load controller from the TAP controller; and
a setting device operable, after the selection of the one of the plurality of execution processing cores by setting said core selection information by cutting the aforementioned core selection fuse means, to if necessary, scan set the core selection information to the fuse overwrite scan latch, and to select and output the output of the fuse overwrite scan latch for the aforementioned selector.

* * * * *